United States Patent
Edpalm et al.

(10) Patent No.: US 12,323,589 B2
(45) Date of Patent: Jun. 3, 2025

(54) METHOD, AN IMAGE PROCESSING DEVICE FOR DIVIDING AN ARRAY OF PIXELS INTO SLICES AND TILES, AND A SYSTEM FOR ENCODING THE SLICES AND TILES INTO A VIDEO STREAM

(71) Applicant: Axis AB, Lund (SE)

(72) Inventors: Viktor Edpalm, Lund (SE); Song Yuan, Lund (SE); Toivo Henningsson, Lund (SE)

(73) Assignee: AXIS AB, Lund (SE)

( * ) Notice: Subject to any disclaimer, the term of this patent is extended or adjusted under 35 U.S.C. 154(b) by 113 days.

(21) Appl. No.: 18/073,597

(22) Filed: Dec. 2, 2022

(65) Prior Publication Data

US 2023/0199183 A1 Jun. 22, 2023

(30) Foreign Application Priority Data

Dec. 22, 2021 (EP) ..................................... 21216704

(51) Int. Cl.
*H04N 19/119* (2014.01)
*H04N 19/174* (2014.01)
(Continued)

(52) U.S. Cl.
CPC ......... *H04N 19/119* (2014.11); *H04N 19/174* (2014.11); *H04N 19/182* (2014.11); *H04N 19/423* (2014.11)

(58) Field of Classification Search
CPC .. H04N 19/119; H04N 19/174; H04N 19/182; H04N 19/423; H04N 19/436; H04N 19/176; H04N 19/136
See application file for complete search history.

(56) References Cited

U.S. PATENT DOCUMENTS

| 8,654,860 B2 | 2/2014 | Huang et al. |
| 10,771,793 B2 * | 9/2020 | Merkle ................ H04N 19/176 |

(Continued)

FOREIGN PATENT DOCUMENTS

| CN | 109040701 A | 12/2018 |
| EP | 2866439 A1 | 4/2015 |
| EP | 3713235 A1 | 9/2020 |

OTHER PUBLICATIONS

Wien, "High Efficiency Video Coding" Coding Tools and Specification, Springer, 2015, 8 pages.
(Continued)

*Primary Examiner* — Dramos Kalapodas
(74) *Attorney, Agent, or Firm* — XSENSUS LLP

(57) ABSTRACT

An image processing device, a non-transitory computer-readable storage medium and a method for dividing an array of pixels into slices and tiles, and a system for encoding the slices and tiles into a video stream by means of a first encoder arranged in a first image processing circuitry and a second encoder arranged in a second image processing circuitry are disclosed. The array of pixels consists of a first subset of pixels having pixel data stored in a first buffer arranged in the first image processing circuitry and a second subset of pixels having pixel data stored in a second buffer arranged in the second image processing circuitry, wherein a first border between the first subset of pixels and the second subset of pixels is tilted at a tilt angle in relation to the array of pixels. The array of pixels is divided into two or more slices, and each slice is divided into two or more tiles. The two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. Dividing each slice into two or more tiles com- (Continued)

prises setting a second border between the first subset of tiles and the second subset of tiles at an offset between two adjacent slices of the two or more slices, wherein the offset is based on the tilt angle.

13 Claims, 17 Drawing Sheets

(51) Int. Cl.
*H04N 19/182* (2014.01)
*H04N 19/423* (2014.01)

(56) References Cited

U.S. PATENT DOCUMENTS

| | | | |
|---|---|---|---|
| 10,820,010 B2* | 10/2020 | Ardö | H04N 19/55 |
| 2021/0067776 A1* | 3/2021 | Reuze | H04N 19/139 |
| 2021/0274176 A1 | 9/2021 | Kang et al. | |
| 2022/0232213 A1* | 7/2022 | Hannuksela | H04N 19/174 |

OTHER PUBLICATIONS

Finchelstein et al., "Multicore Processing and Efficient On-Chip Caching for H.264 and Future Video Decoders", IEEE Transactions on Circuits and Systems for Video Technology, vol. 19, No. 11, Nov. 2009, pp. 1704-1713.
"HEVC: An introduction to high efficiency coding", Vcodex Ltd., 2007, 7 pages.
Feldman, "Efficient Stream-Reassembling for Video Conferencing Applications using Tiles in HEVC", The Fifth International Conferences on Advances in Multimedia, 2013, pp. 130-135.

\* cited by examiner

| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |

Figures 7A, 7B:
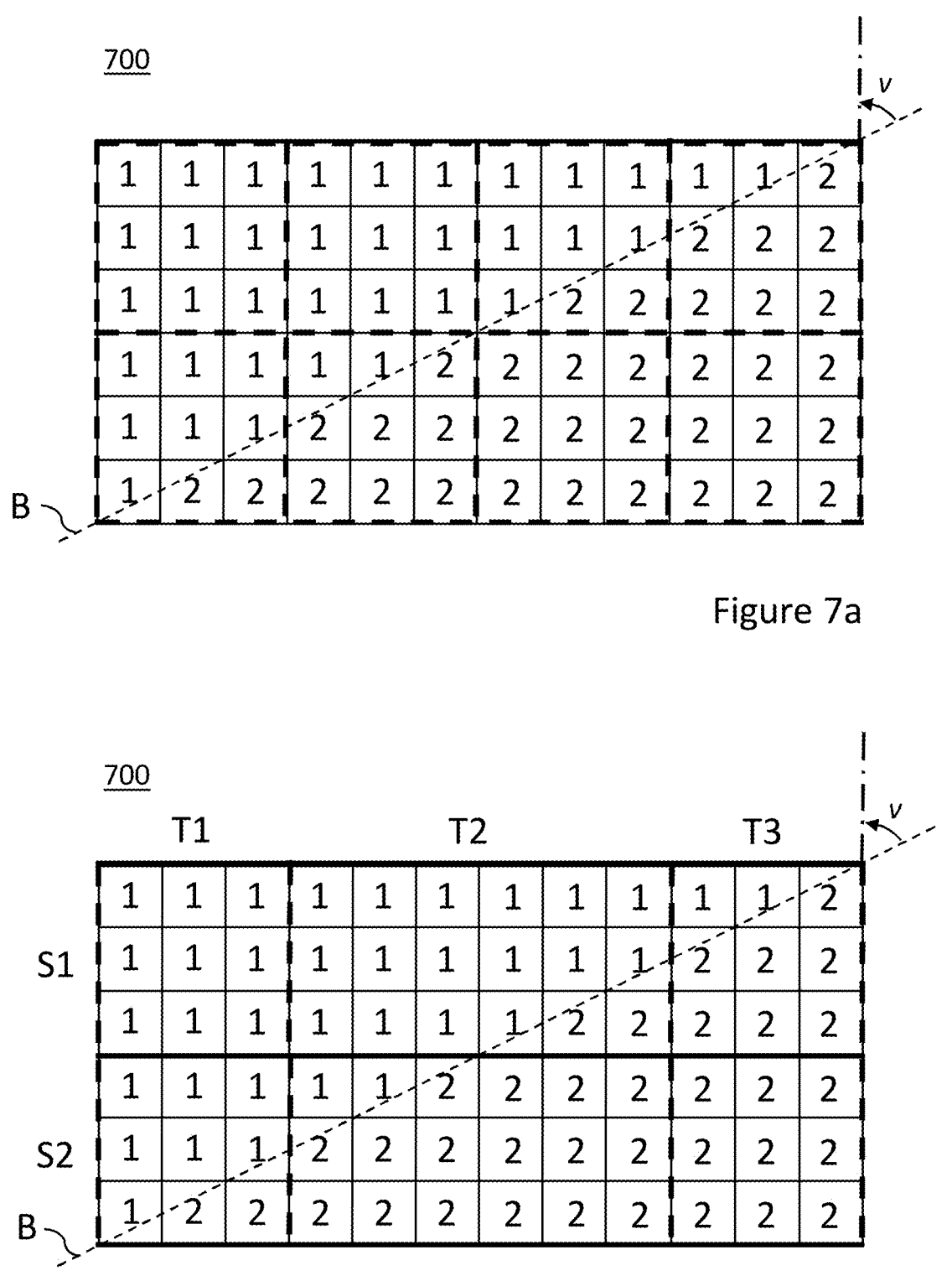

| 1 | 1 | 1 | 1 | 1 | 1 | 1 | 1 | 1 | 1 | 1 | 2 |
| 1 | 1 | 1 | 1 | 1 | 1 | 1 | 1 | 1 | 2 | 2 | 2 |
| 1 | 1 | 1 | 1 | 1 | 1 | 1 | 2 | 2 | 2 | 2 | 2 |
| 1 | 1 | 1 | 1 | 1 | 2 | 2 | 2 | 2 | 2 | 2 | 2 |
| 1 | 1 | 1 | 2 | 2 | 2 | 2 | 2 | 2 | 2 | 2 | 2 |
| 1 | 2 | 2 | 2 | 2 | 2 | 2 | 2 | 2 | 2 | 2 | 2 |

|  | T1 | | | T2 | | | | | | T3 | | |
| --- | --- | --- | --- | --- | --- | --- | --- | --- | --- | --- | --- | --- |
| S1 | 1 | 1 | 1 | 1 | 1 | 1 | 1 | 1 | 1 | 1 | 1 | 2 |
| | 1 | 1 | 1 | 1 | 1 | 1 | 1 | 1 | 1 | 2 | 2 | 2 |
| | 1 | 1 | 1 | 1 | 1 | 1 | 1 | 2 | 2 | 2 | 2 | 2 |
| S2 | 1 | 1 | 1 | 1 | 1 | 2 | 2 | 2 | 2 | 2 | 2 | 2 |
| | 1 | 1 | 1 | 2 | 2 | 2 | 2 | 2 | 2 | 2 | 2 | 2 |
| | 1 | 2 | 2 | 2 | 2 | 2 | 2 | 2 | 2 | 2 | 2 | 2 |

|    | | | | | | | | | | | | |
|----|---|---|---|---|---|---|---|---|---|---|---|---|
|    | 1 | 1 | 1 | 1 | 1 | 1 | 1 | 1 | 1 | 1 | 2 | 2 |
| S1 | 1 | 1 | 1 | 1 | 1 | 1 | 1 | 1 | 1 | 2 | 2 | 2 |
|    | 1 | 1 | 1 | 1 | 1 | 1 | 1 | 1 | 2 | 2 | 2 | 2 |
|    | 1 | 1 | 1 | 1 | 1 | 1 | 1 | 1 | 2 | 2 | 2 | 2 |
| S2 | 1 | 1 | 1 | 1 | 1 | 1 | 1 | 2 | 2 | 2 | 2 | 2 |
|    | 1 | 1 | 1 | 1 | 1 | 1 | 2 | 2 | 2 | 2 | 2 | 2 |
|    | 1 | 1 | 1 | 1 | 1 | 1 | 2 | 2 | 2 | 2 | 2 | 2 |
| S3 | 1 | 1 | 1 | 1 | 1 | 1 | 2 | 2 | 2 | 2 | 2 | 2 |
|    | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |
| S4 | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |

|    | T1 | | | T2 | | | T3 | T4 | T5 | T6 | | T7 | |
|----|---|---|---|---|---|---|---|---|---|---|---|---|---|
|    | 1 | 1 | 1 | 1 | 1 | 1 | 1 | 1 | 1 | 1 | 2 | 2 |
| S1 | 1 | 1 | 1 | 1 | 1 | 1 | 1 | 1 | 1 | 2 | 2 | 2 |
|    | 1 | 1 | 1 | 1 | 1 | 1 | 1 | 1 | 2 | 2 | 2 | 2 |
|    | 1 | 1 | 1 | 1 | 1 | 1 | 1 | 1 | 2 | 2 | 2 | 2 |
| S2 | 1 | 1 | 1 | 1 | 1 | 1 | 1 | 2 | 2 | 2 | 2 | 2 |
|    | 1 | 1 | 1 | 1 | 1 | 1 | 2 | 2 | 2 | 2 | 2 | 2 |
|    | 1 | 1 | 1 | 1 | 1 | 1 | 2 | 2 | 2 | 2 | 2 | 2 |
| S3 | 1 | 1 | 1 | 1 | 1 | 1 | 2 | 2 | 2 | 2 | 2 | 2 |
|    | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |
| S4 | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |

|    |   |   |   |   |   |   |   |   |   |   |   |   |
|----|---|---|---|---|---|---|---|---|---|---|---|---|
|    | 1 | 1 | 1 | 1 | 1 | 1 | 1 | 1 | 1 | 1 | 2 | 2 |
| S1 | 1 | 1 | 1 | 1 | 1 | 1 | 1 | 1 | 1 | 2 | 2 | 2 |
|    | 1 | 1 | 1 | 1 | 1 | 1 | 1 | 1 | 2 | 2 | 2 | 2 |
|    | 1 | 1 | 1 | 1 | 1 | 1 | 1 | 1 | 2 | 2 | 2 | 2 |
| S2 | 1 | 1 | 1 | 1 | 1 | 1 | 1 | 2 | 2 | 2 | 2 | 2 |
|    | 1 | 1 | 1 | 1 | 1 | 1 | 2 | 2 | 2 | 2 | 2 | 2 |
|    | 1 | 1 | 1 | 1 | 1 | 1 | 2 | 2 | 2 | 2 | 2 | 2 |
| S3 | 1 | 1 | 1 | 1 | 1 | 1 | 2 | 2 | 2 | 2 | 2 | 2 |
|    | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |
| S4 | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |

| 1 | 1 | 1 | 1 | 1 | 1 | 2 | 2 | 2 | 2 | 2 | 2 |
|---|---|---|---|---|---|---|---|---|---|---|---|
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |
| 1 | 1 | 1 | 1 | 1 | 2 | 2 | 2 | 2 | 2 | 2 | 2 |
| 1 | 1 | 1 | 1 | 1 | 2 | 2 | 2 | 2 | 2 | 2 | 2 |
| 1 | 1 | 1 | 1 | 1 | 2 | 2 | 2 | 2 | 2 | 2 | 2 |
| 1 | 1 | 1 | 1 | 1 | 2 | 2 | 2 | 2 | 2 | 2 | 2 |
| 1 | 1 | 1 | 1 | 1 | 2 | 2 | 2 | 2 | 2 | 2 | 2 |
| 1 | 1 | 1 | 1 | 1 | 2 | 2 | 2 | 2 | 2 | 2 | 2 |
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |
| 1 | 1 | 1 | 1 | 1 | 1 | 2 | 2 | 2 | 2 | 2 | 2 |

|     | T1  |   |   | T2 |   |   | T3 |   |   | T4 |   |   | T5 |   |   |
|-----|---|---|---|---|---|---|---|---|---|---|---|---|---|---|---|

1000

|    | 1 | 1 | 1 | 1 | 1 | 1 | 2 | 2 | 2 | 2 | 2 | 2 |
|----|---|---|---|---|---|---|---|---|---|---|---|---|
| S1 | 1 | 1 | 1 | 1 | 1 | 1 | 2 | 2 | 2 | 2 | 2 | 2 |
|    | 1 | 1 | 1 | 1 | 1 | 1 | 2 | 2 | 2 | 2 | 2 | 2 |
|    | 1 | 1 | 1 | 1 | 1 | 2 | 2 | 2 | 2 | 2 | 2 | 2 |
| S2 | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |
| S3 | 1 | 1 | 1 | 1 | 1 | 2 | 2 | 2 | 2 | 2 | 2 | 2 |
|    | 1 | 1 | 1 | 1 | 1 | 2 | 2 | 2 | 2 | 2 | 2 | 2 |
|    | 1 | 1 | 1 | 1 | 1 | 1 | 2 | 2 | 2 | 2 | 2 | 2 |
| S4 | 1 | 1 | 1 | 1 | 1 | 1 | 2 | 2 | 2 | 2 | 2 | 2 |
|    | 1 | 1 | 1 | 1 | 1 | 1 | 2 | 2 | 2 | 2 | 2 | 2 |

METHOD, AN IMAGE PROCESSING DEVICE FOR DIVIDING AN ARRAY OF PIXELS INTO SLICES AND TILES, AND A SYSTEM FOR ENCODING THE SLICES AND TILES INTO A VIDEO STREAM

CROSS-REFERENCE TO RELATED APPLICATION

This application claims priority to European Patent Application No. 21216704.3 filed on Dec. 22, 2021, the entire disclosure of which is incorporated by reference herein.

TECHNICAL FIELD

The present invention relates to image processing, and specifically to dividing an array of pixels into slices and tiles for encoding into an encoded video stream using a respective one of two separate image processing circuitries for encoding and buffering in relation to two subsets of pixels of the array of pixels.

BACKGROUND

Over time image frames have become larger e.g. due to higher resolution and larger image sensors. Other examples of large image frames are panoramic image frames constructed by stitching together image frames captured by multiple image sensors. When processing such large image frames of a video stream, such as encoding the image frames, each image frame may be divided into two or more image portions which are then processed in parallel in separate processing circuitries. Similarly, the encoded image frame may also be divided into corresponding two or more image portions on a decoder side and the two or more image portions are then processed in parallel in separate processing circuitries. In such solutions, it is generally desirable that the separate processing circuitries can process the respective image portions independently to as large an extent as possible and share as little pixel data as possible since such sharing requires synchronization including transfer of pixel data between the processing circuitries which will slow down the processing and/or requires faster transfer of pixel data between the processing circuitries which increases the complexity and cost of the processing circuitries.

SUMMARY OF THE INVENTION

An object of the present invention is to provide a method, an image processing device, and a system for dividing an array of pixels into slices and tiles for encoding into an encoded video stream using a respective one of two separate image processing circuitries for encoding and buffering in relation to two subsets of pixels of the array of pixels which overcome or mitigate issues in known methods, image processing devices and systems.

According to a first aspect a method for dividing an array of pixels into slices and tiles for encoding into an encoded video stream by means of a first encoder arranged in a first image processing circuitry and a second encoder arranged in a second image processing circuitry is provided. The array of pixels consists of a first subset of pixels having pixel data stored in a first buffer arranged in the first image processing circuitry and a second subset of pixels having pixel data stored in a second buffer arranged in the second image processing circuitry, wherein a first border between the first subset of pixels and the second subset of pixels is tilted at a tilt angle in relation to the array of pixels. The method comprises dividing the array of pixels into two or more slices, and dividing each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. In the act of dividing each slice into two or more tiles comprises, a second border between the first subset of tiles and the second subset of tiles is set at an offset between two adjacent slices of the two or more slices, wherein the offset is based on the tilt angle.

By setting a second border between the first subset of tiles and the second subset of tiles at an offset between two adjacent slices of the two or more slices, wherein the offset is based on the tilt angle, the number of pixels to be encoded by the first encoder into the first subset of tiles of each slice that have pixel data stored in the second buffer plus the number of pixels to be encoded by the second encoder into the second subset of tiles of each slice that have pixel data stored in the first buffer is reduced in relation to not using an offset when the first border between the first subset of pixels and the second subset of pixels is tilted at a tilt angle in relation to the array of pixels. Hence, the amount of pixel data stored in the second buffer that needs be transferred to the first encoder and the amount of pixel data stored in the first buffer that needs be transferred to the second encoder is reduced in relation to not using an offset.

By a slice is meant a vertical separation—one above the other. Each slice may be encoded without the need for access to image data relating to other slices.

By tile is meant a horizontal separation—one horizontally next to the other. Each tile may be encoded without the need for access to image data relating to other tiles.

By the first border tilting at a tilt angle here is meant that at least somewhere along the first border, the first border between the first and second subset of pixels does not extend along a column or row of pixels of the array of pixels such that pixels in a same column of pixels are located on different sides of the first border between the first and second subset of pixels and pixels in a same row of pixels are located on different sides of the first border between the first and second subset of pixels.

An offset here is meant an offset along the length of the slices, i.e. such that the second borders between the first subset of tiles and the second subset of tiles in two adjacent slices are not aligned along the lengths of the slices.

By the offset being based on the tilt angle is meant that the offset between two adjacent slices is set taking into account the tilt angle such that different offsets will be set for different tilt angles. For example, the offset may be set based on the tilt angle such that when subsequently encoding the first subset of tiles and the second subset of tiles into an encoded video stream by means of a first encoder and a second encoder, respectively, the number of pixels to be encoded into the first subset of tiles of each slice that have pixel data stored in the second buffer plus the number of pixels to be encoded into the second subset of tiles of each slice that have pixel data stored in the first buffer is minimized or at least kept as low as possible. For example, the methodology for setting offset based on tilt angle may be iterative such that the sum of the number of pixels to be encoded into the first subset of tiles of each slice that have pixel data stored in the second buffer and the number of pixels to be encoded into the second subset of tiles of each slice that have pixel data stored in the first buffer is determined for different offsets and the offset is set to the offset resulting in the lowest sum.

The tilt angle may be constant along the first border between the first subset of pixels and the second subset of pixels. The offset may then be set to be the same for each two adjacent slices of the two or more slices.

In alternative, the tilt angle may vary along the first border between the first subset of pixels and the second subset of pixels. The act of dividing the array of pixels into two or more slices may then comprise dividing the array of pixels into three or more slices, and the act of dividing each slice into two or more tiles may comprise, for each two adjacent slices of the three or more slices, setting a second border between the first subset of tiles and the second subset of tiles of each slice of the two adjacent slices at an offset, wherein the offset is based on a local tilt angle of the first border between the first subset of pixels and the second subset of pixels in the two adjacent slices.

By a local tilt angle is meant a measure of the tilt angle of the first border in the two adjacent slices for which the offset is to be set.

In scenarios where the tilt angle varies along the first border between the first subset of pixels and the second subset of pixels, the first border between the first subset of pixels and the second subset of pixels may be tilted at a constant but separate tilt angle in separate horizontal portions of the array of pixels. The act of dividing the array of pixels into three or more slices may then comprise dividing the array of pixels into four or more slices by dividing each separate horizontal portion of the array of pixels into two or more slices such that, for each two adjacent horizontal portions, a third border between the two adjacent horizontal portions is aligned with a fourth border between two adjacent slices. By aligning the fourth border between two adjacent slices with the third border between the two adjacent horizontal portions, the first border will have a constant tilt angle in the slices in each horizontal portion. This will enable a setting of offset of the second border in each slice based on the tilt angle of the first border in that slice which results in a reduced amount of data requiring transfer between image processing circuitries for encoding in relation not having an offset. In alternative, the first border between the first subset of pixels and the second subset of pixels may be curved.

In scenarios where the tilt angle varies along the first border between the first subset of pixels and the second subset of pixels, the local tilt angle of the first border in the two adjacent slices may be determined as an average tilt angle in the two adjacent slices.

Sizes of corresponding tiles of the two or more tiles of each of the two or more slices may be the same in each of the two or more slices. In other words, borders between tiles in the two or more slices may be horizontally aligned.

The method may further comprise transferring pixel data to be encoded into pixels of the first subset of tiles of each slice having pixel data stored in the second buffer to the first encoder, encoding the first subset of tiles by means of the first encoder, transferring pixel data of pixels to be encoded into the second subset of tiles of each slice having pixel data stored in the first buffer to the second encoder, and encoding the second subset of tiles by means of the second encoder.

According to a second aspect, a non-transitory computer-readable storage medium is provided having stored thereon instructions for implementing the method according to the first aspect when executed by a device having processing capabilities.

According to a third aspect, an image processing device is provided for dividing an array of pixels into slices and tiles for encoding into an encoded video stream by means of a first encoder arranged in a first image processing circuitry and a second encoder arranged in a second image processing circuitry. The array of pixels consists of a first subset of pixels having pixel data stored in a first buffer arranged in the first image processing circuitry and a second subset of pixels having pixel data stored in a second buffer arranged in the second image processing circuitry, wherein a first border between the first subset of pixels and the second subset of pixels is tilted at a tilt angle in relation to the array of pixels. The device comprises circuitry configured to execute a first dividing function configured to divide the array of pixels into two or more slices, and a second dividing function configured to divide each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. The second dividing function is further configured to set a second border between the first subset of tiles and the second subset of tiles at an offset between two adjacent slices of the two or more slices, wherein the offset is based on the tilt angle.

The above-mentioned optional features of the method according to the first aspect, when applicable, apply to this third aspect as well. In order to avoid undue repetition, reference is made to the above.

According to a fourth aspect, a system for encoding an array of pixels into an encoded video stream is provided. The array of pixels consists of a first subset of pixels and a second subset of pixels and a first border between the first subset of pixels and the second subset of pixels is tilted at a tilt angle in relation to the array of pixels. The system comprises a first image processing circuitry, second image processing circuitry, a first encoder arranged in the first image processing circuitry, a second encoder arranged in the second image processing circuitry, a first buffer arranged in the first image processing circuitry, the first buffer storing pixel data of the first subset of pixels, and a second buffer arranged in the second image processing circuitry, the second buffer storing pixel data of the second subset of pixels. The system further comprises circuitry configured to execute a first dividing function configured to divide the array of pixels into two or more slices, and a second dividing function configured to divide each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. The second dividing function is further configured to set a second border between the first subset of tiles and the second subset of tiles at an offset between two adjacent slices of the two or more slices, wherein the offset is based on the tilt angle. The circuitry is further configured a first transferring function configured to transfer pixel data of pixels to be encoded into the first subset of tiles of each slice having pixel data stored in the second buffer to the first encoder, and a second transferring function configured to transfer pixel data of pixels to be encoded into the second subset of tiles of each slice having pixel data stored in the first buffer to the second encoder. The first encoder is configured to encode the first subset of tiles, and the second encoder is configured to encode the second subset of tiles.

The above-mentioned optional features of the method according to the first aspect, when applicable, apply to this fourth aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding. Like reference numerals refer to like elements throughout.

FIG. 5 is a schematic illustration of a division into four portions of an image frame captured using a single image sensor.

FIG. 6 shows a division of an array of pixels into tiles according to a prior art method for a first example with a horizontal border between the first and second subsets of pixels.

FIG. 7a shows a division of an array of pixels into tiles according to a prior art method for a second example with a constant tilt angle.

FIG. 7b show an example of division of an array of pixels into slices and tiles according to a method of the present disclosure for the second example having the same constant tilt angle as in FIG. 7a.

FIGS. 8b, 8c and 8d show divisions of an array of pixels according to methods of the present disclosure into slices and tiles for the third example with the same varying tilt angle as in FIG. 8a where the tilt angle is constant but different in two horizontal portions.

FIGS. 9b, 9c and 9d show divisions of an array of pixels according to methods of the present disclosure into slices and tiles for the fourth example with same varying tilt angle as in FIG. 9a where the first border between first and second subsets of pixels is curved.

FIG. 10a shows a division of an array of pixels according to a prior art method into tiles for a fifth example with varying tilt angle where the first border between first and second subsets of pixels is curved.

FIGS. 10b, 10c and 10d show divisions of an array of pixels according to methods of the present disclosure into slices and tiles for the fifth example with the same varying tilt angle as in FIG. 10a where the first border between first and second subsets of pixels is curved.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein. Rather, these embodiments are provided for thoroughness and completeness, and to convey the scope of the invention to the skilled person.

In the following system 100 for encoding an array of pixels into an encoded video stream according to the present disclosure will be discussed with reference to FIG. 1. The system 100 is intended to be used in a scenario wherein the array of pixels consists of a first subset of pixels and a second subset of pixels and a first border between the first subset of pixels and the second subset of pixels is tilted at a tilt angle in relation to the array of pixels, and wherein the first subset of pixels and the second subset of pixels are processed separately in respective processing circuitries, for example in order to enable parallel processing.

Figure 4:
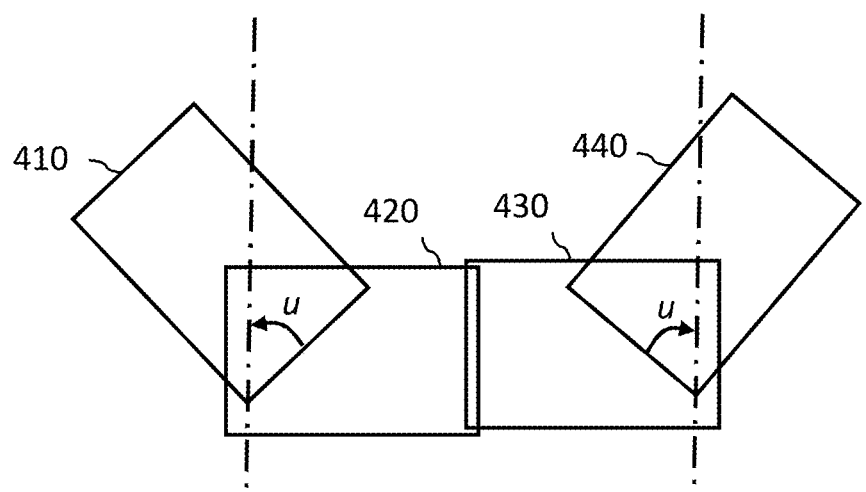
FIG. 4 is a schematic illustration of a combination of four sensors for capturing a single image frame.

The system 100 may for example be used in relation to encoding of a large image frame, such as a panoramic image frame constructed by stitching together image frames captured by multiple image sensors. The array of pixels to be encoded in system 100 would then relate to pixels from two image sensors of the multiple image sensor. The pixels of the array of pixels would then typically have been processed by horizontal correction transformation of pixel data and stitching and blending of pixel data to remove or reduce any visible effects at the first border between pixels from the two separate image sensors. Further processing of the array of pixels may also have been performed before the array of pixel is obtained in the system 100. If such processing is done separately (typically in parallel) in two image processing circuitries, pixel data have to be transferred between the two image processing circuitries. Furthermore, in some cases a first border between pixel data of the array of pixels processed in different one of the two image processing circuits may be tilted in relation to the array of pixels. An example of a set-up of a first image sensor 410, a second image sensor 420, a third image sensor 430, and a fourth image sensor 440 is shown in FIG. 4. The second and third image sensors 420, 430 are arranged in the middle without any mutual tilting whereas the first and fourth image sensors 410, 440 are arranged tilted at an angle u in relation to the second and third image sensors 420, 430, respectively. For an array of pixels to be processed in the system 100 comprising pixel data relating to the first image sensor 410 and the second image sensor 420 for example, a first border between pixel data after processing relating to stitching and any further processing that should be processed by different processing circuits will be tilted at an angle in relation to the array of pixels. This tilting is partially due to the angle u between the first image sensor 410 and the second image sensor 420, and partially due to transformation before the processing of the system 100. Tilting of the first border may also occur for other reasons than mutual tilting between the images sensors, e.g. due to horizontal correction transformation, in an array of pixel relating to processed image data from the second and third image sensors 420, 430.

The system 100 may for example also be used in relation to encoding of a large image frame, e.g. captured using a wide angle lens, wherein the large image frame has been divided in to two or more vertical portions. An array of pixels to be encoded in system 100 would then relate to pixels from two portions of the image frame. The pixels of the array of pixels would then typically have been processed before the array of pixel is obtained in the system 100. Such processing may for example include transformation of the pixel data in relation to sphere- or cylinder-projections. When such processing in relation to stitching and any further processing may have been done separately (typically in parallel) in two image processing circuitries, pixel data this will typically require transfer of pixel data between the two image processing circuitries. Furthermore, in some cases a first border between the pixel data of the array of pixels, processed in a different one of the two image processing circuits, may be tilted in relation to the array of pixels such that the first border is curved, e.g. due to transformation of the pixel data in relation to sphere- or cylinder-projections. An example of a division of an image frame 500 into a first image portion 510, a second image portion 520, a third image portion 530, and a fourth image portion 540 is shown in FIG. 5. When, for example, an array of pixels to be processed in the system 100 comprising pixel data relating to the first image portion 510 and the second image portion 520 have been processed in a respective one of the two processing circuitries, e.g. including horizontal correction transformation of the pixel data in order to adjust for lens distortions, a first border between the pixel data of the array of pixel processed in different ones of the two image processing circuits may be tilted in relation to the array of pixels such that the first border is curved.

The system 100 comprises a first image processing circuitry 110, a second image processing circuitry 120, a first encoder 112 arranged in the first image processing circuitry 110, a second encoder 122 arranged in the second image processing circuitry 120, a first buffer 114 arranged in the first image processing circuitry 110, and a second 124 buffer arranged in the second image processing circuitry 120. The first buffer 114 stores pixel data relating to the first subset of pixels, and the second buffer 124 stores pixel data relating to the second subset of pixels. The first and second processing circuitries 110, 120 may each include a first and second processor 116, 126, respectively, such as a central processing unit (CPU), microcontroller, or microprocessor. The first and second encoders 112, 122 may for example be adapted to encode according to H.262, H.265, H.266, AV1 and VP9 video compression standards.

The system 100 further comprises a circuitry 130. The circuitry 130 is configured to carry out functions of the system 100. The circuitry may for example be comprised in an image processing device 300 which will be described further in relation to FIG. 3. The circuitry 130 may include a processor 132, such as a central processing unit (CPU), microcontroller, or microprocessor. The processor 132 is configured to execute program code. The program code may for example be configured to carry out functions of the system 100.

The system 100 may further comprise a memory 140. The memory 140 may be one or more of a buffer, a flash memory, a hard drive, a removable media, a volatile memory, a non-volatile memory, a random access memory (RAM), or another suitable device. In an example arrangement, the memory 140 includes a non-volatile memory for long term data storage and a volatile memory that functions as system memory for the circuitry 130. The memory 140 may exchange data with the circuitry 130 over a data bus. Accompanying control lines and an address bus between the memory 140 and the circuitry 130 may also be present. Data may further be exchanged between the first processing circuitry 110 and the second processing circuitry 120 over a data bus.

Functions of the system 100 may be embodied in the form of executable logic routines (e.g., lines of code, software programs, etc.) that are stored on a non-transitory computer readable medium (e.g., the memory 140) of the system 100 and are executed by the circuitry 130 (e.g., using the processor 132). Furthermore, the functions of the image processing device 100 may be a stand-alone software application or form a part of a software application that carries out additional tasks related to the image processing device 100. The described functions may be considered a method that a processing unit, e.g. the processor 132, of the circuitry 130 is configured to carry out. Also, while the described functions may be implemented in software, such functionality may as well be carried out via dedicated hardware or firmware, or some combination of hardware, firmware and/or software.

As the system 100 is intended to be used in a scenario wherein the first subset of pixels and the second subset of pixels are encoded separately in the first processing circuitry 110 and the second processing circuitry 120, respectively, it is desirable that as small amount of pixel data as possible are shared between the first and second processing circuitries 110, 120 since such sharing requires synchronization including transfer of pixel data between the first and second processing circuitries 110, 120 which will slow down the processing. Hence, when encoding pixel data in one of the first and second processing circuitries 110, 120, such encoding should preferably require transfer of as small amount of pixel data as possible. As encoding will be performed in tiles of slices, the division into slices and tiles should be such that each tile relates to pixel data only, or mainly, from one of the first subset of pixels and the second subset of pixels, i.e. some tiles may relate to pixel data mainly from the first subset of pixels and some tiles may relate to pixel data mainly from the seconds subset of pixels. To this end, the circuitry 130 is configured to execute dividing functions to divide the array of pixels into slices and tiles based on the tilt angle.

Specifically, the circuitry 130 is configured to execute a first dividing function 151 configured to divide the array of pixels into two or more slices. The first dividing function 151 is configured to divide the array of pixels into at least 2 slices but typically not more than 100 slices and preferably into 4-16 slices.

The circuitry 130 is further configured to execute a second dividing function 152 configured to divide each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder 112 and the second subset of tiles is to be encoded by the second encoder 122. In addition to being disjunct, the first and second subsets of tiles will each be continuous and mainly relate to pixels on one side of the first border between the first and second subsets of pixels, such that one of the first and second subsets of tiles relates to pixels on one side and the other on pixels on the other side of the first border between the first and second subsets of pixels. The second dividing function is further configured to set a second border between the first subset of tiles and the second subset of tiles at an offset between two adjacent slices of the two or more slices, wherein the offset is based on the tilt angle. Specifically, the offset is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border between the first subset of pixels and the second subset of pixels is tilted at the tilt angle v in relation to the array of pixels. Hence, the amount of pixel data stored in the second buffer that needs be transferred to the first encoder and the amount of pixel data stored in the first buffer that needs be transferred to the second encoder is reduced in relation to not using an offset. For example, the offset may be set based on tilt angle by means of an iterative procedure such that the sum of the number of pixels to be encoded into the first subset of tiles of each slice that have pixel data stored in the second buffer and the number of pixels to be encoded into the second subset of tiles of each slice that have pixel data stored in the first buffer is determined for different offsets and the offset is set to the offset resulting in the lowest sum. In alternative an analytical solution may also be used where a function of the tilt angle is derived from which the offset can be calculated for a determined tilt angle. The second dividing function 152 is configured to divide the array of pixels into at least 2 tiles per slice. The number of tiles per slice may be application specific and could for example be 10 tiles per slice. The number of tiles per slice may be different in different slices.

The circuitry 130 is further configured to execute a first transferring function 153 configured to transfer pixel data of pixels to be encoded into the first subset of tiles of each slice having pixel data stored in the second buffer to the first encoder, and to execute a second transferring function 154 configured to transfer pixel data of pixels to be encoded into the second subset of tiles of each slice having pixel data stored in the first buffer to the second encoder. Transferring of pixel data from the second buffer to the first encoder and from the first buffer to the second encoder may be performed via a Peripheral Component Interconnect (PCI) which results in a slower access to that image data than when the first encoder accesses image data directly in the first buffer and the second encoder accesses image data directly in the second image buffer, respectively.

The circuitry 130 may further be configured to execute a first instructing function 155 configured to instruct the first encoder to encode the first subset of tiles, and to execute a second instructing function 156 configured to instruct the second encoder to encode the second subset of tiles.

The first encoder 112 is configured to encode the first subset of tiles, and the second encoder 114 is configured to encode the second subset of tiles.

The tilt angle may be constant along the first border between the first subset of pixels and the second subset of pixels. The offset may then be set to be the same between each two adjacent slices.

Alternatively, the tilt angle may vary along the first border between the first subset of pixels and the second subset of pixels of the array of pixels. The first dividing function 151 may then be configured to divide the array of pixels into three or more slices and the second dividing function may be configured to use different offsets between different two adjacent slices. Specifically, the offset used between two adjacent slices may be based a local tilt angle in the two adjacent slices.

If the tilt angle varies in two adjacent slices of the three or more slices, which for example will be the case when the first border between the first and second subsets of pixels of the array of pixels is curved, the local tilt angle in the two adjacent slices may be determined as an average tilt angle in the two adjacent slices.

If the tilt angle varies such that it is constant in a first horizontal portion of the array of pixels and also constant but different in a second horizontal portion of the array of pixels, the first dividing function 151 may be configured to divide each separate horizontal portion of the array of pixels into two or more slices such that the array of pixels is divided into four or more slices. The local tilt angle for two adjacent slices in the same horizontal portion of the array of pixels may then be determined as the constant tilt angle in that horizontal portion. The local tilt angle for two adjacent slices in different ones of the horizontal portion of the array of pixels may be determined as the average of the two different but constant tilt angles in the two horizontal portion. By aligning the fourth border between two adjacent slices with the third border between the two adjacent horizontal portions, the first border will have a constant tilt angle in the slices in each horizontal portion. This will enable a setting of offset of the second border in each slice based on the tilt angle of the first border in that slice which results in a reduced amount of data requiring transfer between image processing circuitries for encoding in relation not having an offset.

Sizes of corresponding tiles of the two or more tiles of each of the two or more slices may either be the same or be different in each of the two or more slices. In other words, borders between tiles in the two or more slices may be horizontally aligned or not. This will depend on whether or not different sizes for corresponding tiles of different slices can be decoded or not on a decoder side for the relevant implementation. Furthermore, having the same size of corresponding tiles of the two or more slices may simplify scheduling of encoding since encoding the same size tiles will take a similar amount of time. Having the same size of corresponding tiles of the two or more slices may, when encoding a tile in one slice of the two or more slices, further enable use of image data in the respective buffer for corresponding tiles in other slices of the two or more slices.

In the following, a method 200 for dividing an array of pixels into slices and tiles for encoding into an encoded video stream according to the present disclosure will be discussed with reference to FIG. 2. The method 200 is intended to be used in a scenario wherein the array of pixels consists of a first subset of pixels and a second subset of pixels and a first border between the first subset of pixels and the second subset of pixels is tilted at a tilt angle in relation to the array of pixels, and wherein the first subset of pixels and the second subset of pixels are processed separately in respective processing circuitries, for example in order to enable parallel processing. The method 200 may for example be performed in relation to encoding of a large image frame, such as a panoramic image frame constructed by stitching together image frames captured by multiple image sensors or a large image frame, e.g. captured using a wide angle lens, wherein the large image frame has been divided in to two or more portions, as described in relation to the system 100 with reference to FIG. 1, FIG. 4 and FIG. 5.

As the method 200 is intended to be performed in a scenario wherein the first subset of pixels and the second subset of pixels portion are encoded separately in the first processing circuitry 110 and the second processing circuitry 120, respectively, it is desirable that as little pixel data as possible is shared between the first and second processing circuitries 110, 120 since such sharing requires synchronization including transfer of pixel data between the first and second processing circuitries 110, 120 which will slow down the processing. For example, transferring of pixel data from the second buffer to the first encoder and from the first buffer to the second encoder may be performed via a PCI which results in a slower access to that image data than when the first encoder accesses image data directly in the first buffer and the second encoder accesses image data directly in the second image buffer, respectively. Furthermore, having a further step of synchronization including transfer of pixel data may introduce latency due to one of the image processing circuitries having to wait for the other to receive image data. Hence, when encoding pixel data in one of the first and second processing circuitries 110, 120, such encoding should preferably require transfer of as little pixel data as possible. As encoding will be performed in tiles of slices, the division into slices and tiles should be such that each tile relates to pixel data only, or mainly, from one of the first subset of pixels or the second subset of pixels, i.e. some tiles may relate to pixel data mainly from the first subset of pixels and some tiles may relate to pixel data mainly from the second subset of pixels. To this end, the array of pixels is divided into slices and tiles based on the tilt angle.

The method 200 comprises dividing S210 the array of pixels into two or more slices, and dividing S220 each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. In addition to being disjunct, the first and second subsets of tiles will each be continuous and mainly relate to pixels on one side of the first border between the first and second subsets of pixels, such that one of the first and second subsets of tiles relates to pixels on one side and the other on pixels on the other side of the first border between the first and second subsets of pixels. Dividing S210 each slice into two or more tiles comprises setting a second border between the first subset of tiles and the second subset of tiles at an offset between two adjacent slices of the two or more slices, wherein the offset is based on the tilt angle. Specifically, the offset is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border between the first subset of pixels and the second subset of pixels is tilted at the tilt angle v in relation to the array of pixels. Hence, the amount of pixel data stored in the second buffer that needs be transferred to the first encoder and the amount of pixel data stored in the first buffer that needs be transferred to the second encoder is reduced in relation to not using an offset. For example, the offset may be set based on tilt angle by means of an iterative procedure such that the sum of the number of pixels to be encoded into the first subset of tiles of each slice that have pixel data stored in the second buffer and the number of pixels to be encoded into the second subset of tiles of each slice that have pixel data stored in the first buffer is determined for different offsets and the offset is set to the offset resulting in the lowest sum.

Figure 1:
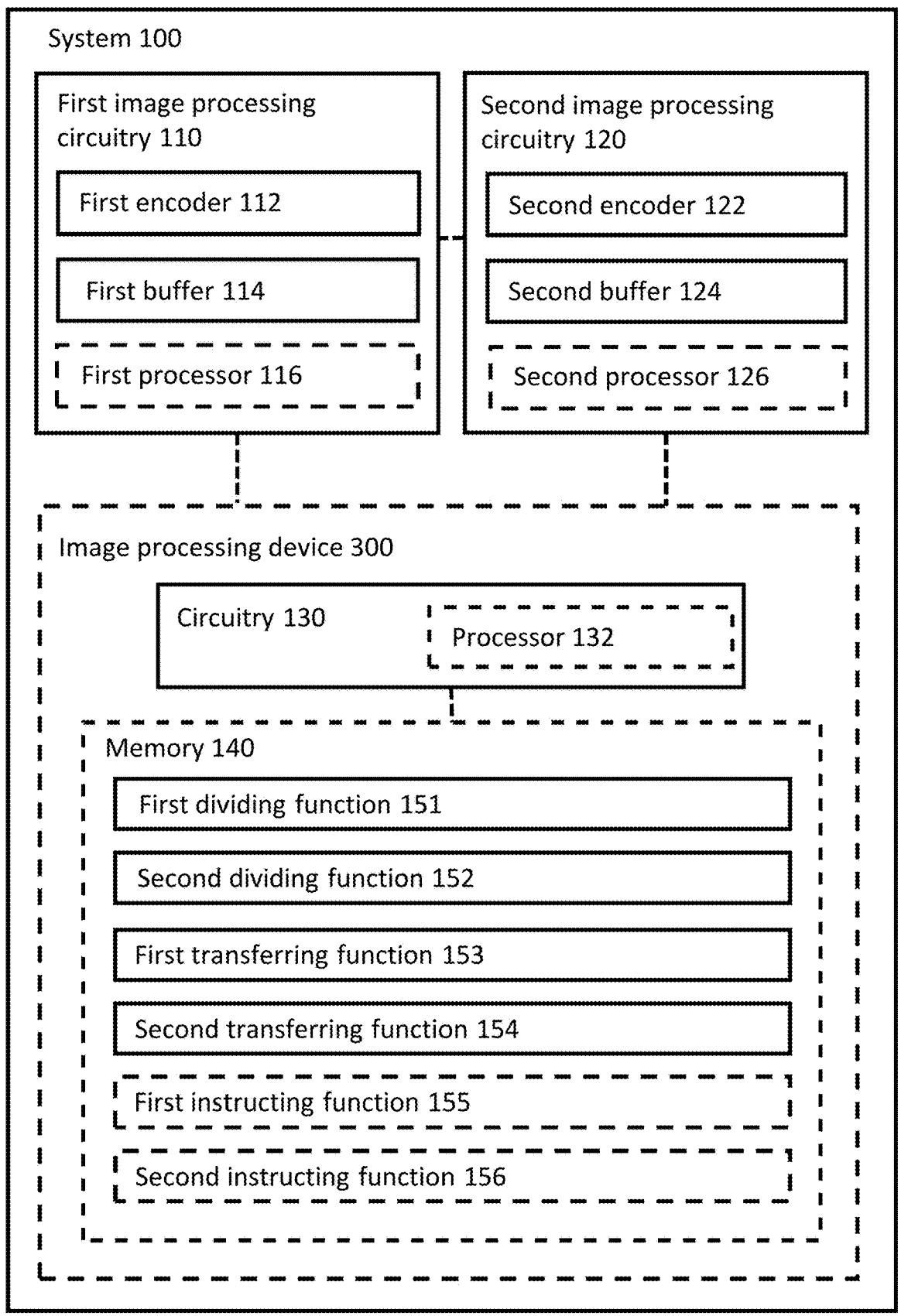
FIG. 1 is a schematic block diagram of a system for encoding an array of pixels into an encoded video stream according to the present disclosure.
Figure 2:
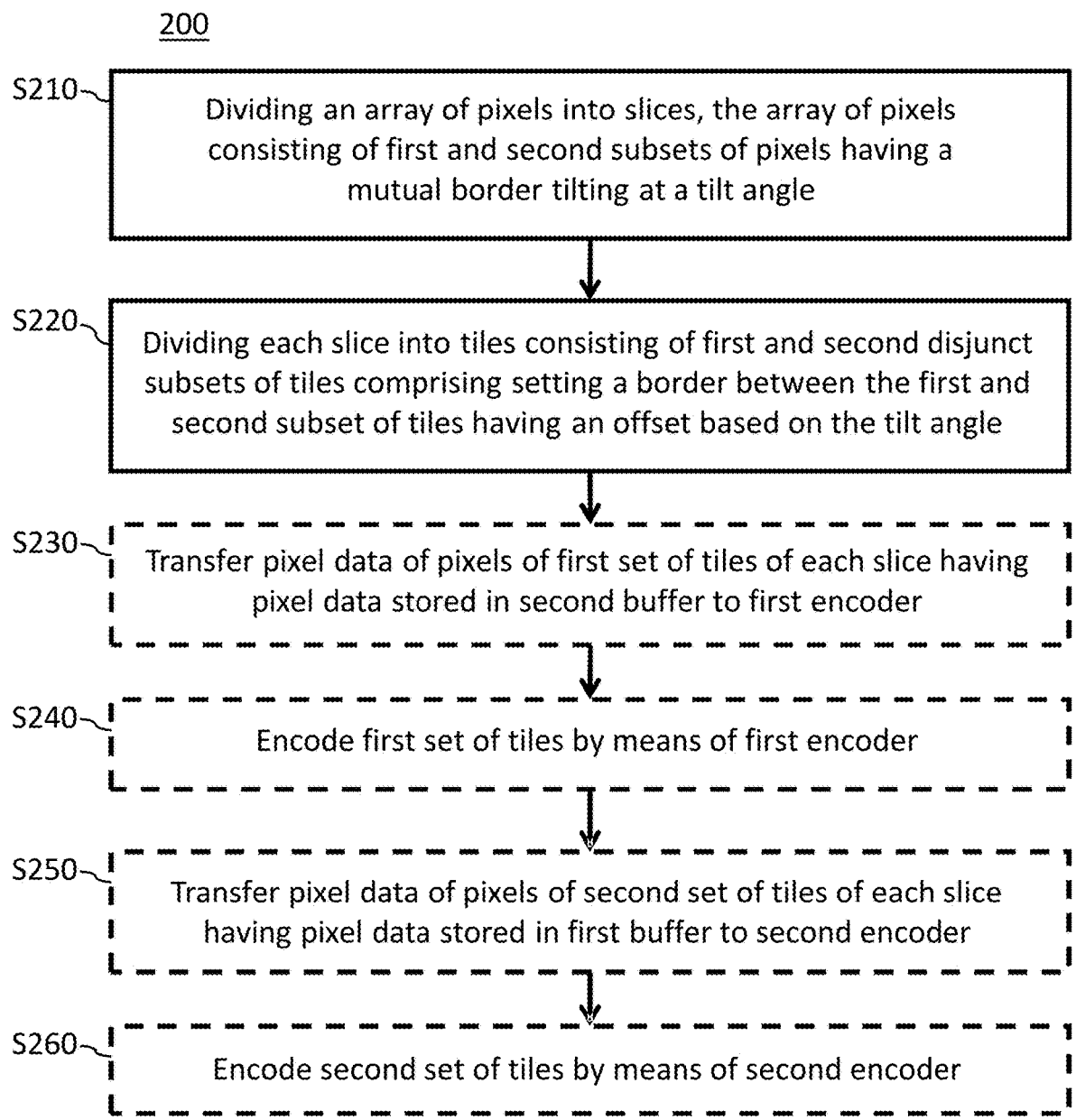
FIG. 2 is a flow chart of a method for dividing an array of pixels into slices and tiles for encoding into an encoded video stream according to the present disclosure, wherein the array of pixels consists of first and second subsets of pixels and a first border between the first and second subsets of pixels is tilted at a tilt angle in relation to the array of pixels.

The method 200 and its included steps may be further adapted as the corresponding functions system 100 as described in relation to FIG. 1.

Figure 3:
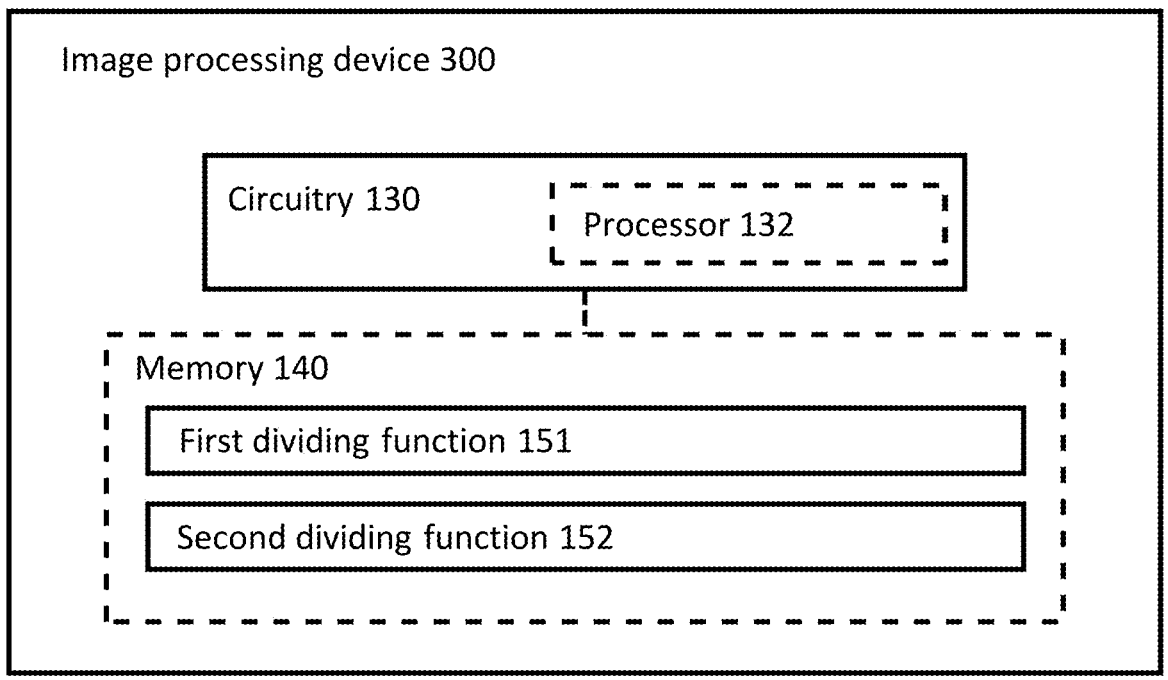
FIG. 3 is a schematic block diagram of an image processing device for dividing an array of pixels into slices and tiles for encoding into an encoded video stream according to the present disclosure.

In the following an image processing device 300 for dividing an array of pixels into slices and tiles according to the present disclosure will be discussed with reference to FIG. 3. The slices and tiles are intended to be encoded into an encoded video stream by means of a first encoder arranged in a first image processing circuitry and a second encoder arranged in a second image processing circuitry. The image processing device 300 is intended to be used in a scenario wherein the array of pixels consists of a first subset of pixels and a second subset of pixels and a border first between the first subset of pixels and the second subset of pixels is tilted at a tilt angle in relation to the array of pixels, and wherein the first subset of pixels and the second subset of pixels are processed separately, for example in order to enable parallel processing. The image processing device 300 may for example be used in relation to encoding of a large image frame, such as a panoramic image frame constructed by stitching together image frames captured by multiple image sensors or a large image frame, e.g. captured using a wide angle lens, wherein the large image frame has been divided in to two or more portions, as described in relation to the system 100 with reference to FIG. 1, FIG. 4 and FIG. 5. The image processing device 300 may be included in a system, such as the system 100 described with reference to FIG. 1.

The image processing device 300 comprises a circuitry 130. The circuitry 130 is configured to carry out functions of the system 100. The circuitry 130 may include a processor 132, such as a central processing unit (CPU), microcontroller, or microprocessor. The processor 132 is configured to execute program code. The program code may for example be configured to carry out functions of the system 100.

The image processing device 300 may further comprise a memory 140. The memory 340 may be one or more of a buffer, a flash memory, a hard drive, a removable media, a volatile memory, a non-volatile memory, a random access memory (RAM), or another suitable device. In an example arrangement, the memory 140 includes a non-volatile memory for long term data storage and a volatile memory that functions as system memory for the circuitry 130. The memory 140 may exchange data with the circuitry 130 over a data bus. Accompanying control lines and an address bus between the memory 140 and the circuitry 130 may also be present. Data may further be exchanged between the first processing circuitry 110 and the second processing circuitry 120 over a data bus.

Functions of the image processing device 300 may be embodied in the form of executable logic routines (e.g., lines of code, software programs, etc.) that are stored on a non-transitory computer readable medium (e.g., the memory 140) of the image processing device 300 and are executed by the circuitry 130 (e.g., using the processor 132). Furthermore, the functions of the image processing device 300 may be a stand-alone software application or form a part of a software application that carries out additional tasks related to the image processing device 300. The described functions may be considered a method that a processing unit, e.g. the processor 132, of the circuitry 130 is configured to carry out. Also, while the described functions may be implemented in software, such functionality may as well be carried out via dedicated hardware or firmware, or some combination of hardware, firmware and/or software.

As the image processing device 300 is intended to be used in a scenario wherein the first subset of pixels and the second subset of pixels are processed separately in a first processing circuitry 110 and a second processing circuitry 120, respectively, it is desirable that as little pixel data as possible is shared between the first and second processing circuitries 110, 120 since such sharing requires synchronization including transfer of pixel data between the first and second processing circuitries 110, 120 which will slow down the processing. Hence, when encoding pixel data in one of the first and second processing circuitries 110, 120, such encoding should preferably require transfer of as little pixel data as possible. As encoding will be performed in tiles of slices, the division into slices and tiles should be such that each tile relates to pixel data mainly from one of the first subset of pixels and the second subset of pixels, i.e. some tiles may relate to pixel data mainly from the first subset of pixels and some tiles may relate to pixel data mainly from the seconds subset of pixels. To this end, the circuitry 130 is configured to execute dividing functions to divide the array of pixels into slices and tiles based on the tilt angle.

Specifically, the circuitry 130 is configured to execute a first dividing function 151 configured to divide the array of pixels into two or more slices.

The circuitry 130 is further configured to execute a second dividing function 152 configured to divide each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. In addition to being disjunct, the first and second subsets of tiles will each be continuous and mainly relate to pixels on one side of the first border between the first and second subsets of pixels, such that one of the first and second subsets of tiles relates to pixels on one side and the other on pixels on the other side of the first border between the first and second subsets of pixels. The second dividing function is further configured to set a second border between the first subset of tiles and the second subset of tiles at an offset between two adjacent slices of the two or more slices, wherein the offset is based on the tilt angle. Specifically, the offset is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border between the first subset of pixels and the second subset of pixels is tilted at the tilt angle v in relation to the array of pixels. Hence, the amount of pixel data stored in the second buffer that needs be transferred to the first encoder and the amount of pixel data stored in the first buffer that needs be transferred to the second encoder is reduced in relation to not using an offset. For example, the offset may be set based on tilt angle by means of an iterative procedure such that the sum of the number of pixels to be encoded into the first subset of tiles of each slice that have pixel data stored in the second buffer and the number of pixels to be encoded into the second subset of tiles of each slice that have pixel data stored in the first buffer is determined for different offsets and the offset is set to the offset resulting in the lowest sum.

The image processing device 300 and its included functions may be further adapted as the corresponding functions of the system 100 as described in relation to FIG. 1.

In the following five examples will be described with reference to FIG. 6, FIGS. 7a-b, FIGS. 8a-d, FIGS. 9a-d and FIGS. 10a-d, wherein an array of pixel is divided into tiles or into slices and tiles. It is to be noted that the absolute and relative sizes of the arrays of pixels, slices, tiles and tilt angles have been selected for illustrational purposes only and hence does not necessarily reflect any real scenario. In FIG. 6, FIGS. 7a-b, FIGS. 8a-d, FIGS. 9a-d and FIGS. 10a-d each square in thin solid lines and including a figure "1" or "2" either corresponds to a single pixel or to a pixel block comprising more than one pixel, each square or rectangle in bold dashed lines corresponds to a tile, and each horizontal bold line indicates a fourth border between slices. For example, in FIG. 7a, the array of pixels 700 is divided into eight square tiles each consisting of nine pixels or pixel blocks, but the array of pixels 700 is not divided into any slices. In FIG. 7b, the array of pixels 700 is divided into two slices each being three pixels or pixel blocks in height, and each slice is divided into three tiles. Four of the tiles consists of nine pixels or pixel blocks and two of the tiles consists of eighteen pixels or pixel blocks.

Reference is now made to FIG. 6 in which a first example of division of an array of pixels 600 into tiles where a first border B between a first subset of pixels and a second subset of pixels is horizontal, i.e. parallel with a column in the array of pixels. The first subset of pixels consists of the squares indicated with the figure "1" and the second subset of pixels consists of the squares indicated with the figure "2". Each square could correspond to a single pixel or a block of pixels comprising more than one pixel. To divide the array of pixels 600 into tiles such that as little pixel data as possible have to be transferred between the first and second processing circuitries when encoding the first subset of pixels and the second subset of pixels separately in a first processing circuitry and a second processing circuitry, respectively, to avoid a need for transfer of pixel data between the first and second circuitries is trivial. For example, the division into the eight tiles shown in FIG. 6 will require no transfer of pixel data.

Reference is now made to FIGS. 7a-b for a second example in which an array of pixels 700 is divided into tiles or into slices and tiles where a first border B between a first subset of pixels and a second subset of pixels is tilted at a constant tilt angle v. The first subset of pixels consists of the squares indicated with the figure "1" and the second subset of pixels consists of the squares indicated with the figure "2". The first subset of pixels has pixel data buffered in the first buffer in the first processing circuitry and the second subset of pixels has pixel data buffered in the first buffer in the first processing circuitry. Each square could correspond to a single pixel or a block of pixels comprising more than one pixel.

In FIG. 7a, the array of pixels 700 has been divided into eight tiles—four columns of tiles with two tiles in each column—according to a prior art method. The pixels of the four tiles in the first two columns from the left are encoded by the first encoder in the first processing circuitry and four tiles in the last two columns from the left are encoded by the second encoder in the second processing circuitry. As can be seen in FIG. 7a, after dividing the array of pixels 700 into tiles according to the prior art method, pixel data of pixels corresponding to nine squares have to be transferred from the second processing circuitry to the first circuitry when encoding the four tiles of the first two columns by the first encoder, and pixel data of pixels corresponding to nine squares have to be transferred from the first processing circuitry to the second circuitry when encoding the four tiles of the last two columns by the second encoder. Hence, in total pixel data of pixels corresponding to eighteen squares have to be transferred between the two processing circuitries using the prior art method in this example.

When a method 200 according to the present disclosure is performed for this first example as shown in FIG. 7b, the array of pixels 700 is first divided into two or more slices and each slice is then be divided into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. When each slice is divided into two or more tiles, a second border between the first subset of tiles and the second subset of tiles is set at an offset between two adjacent slices of the two or more slices, wherein the offset is based on the tilt angle. The division into slices and tiles of the method used in relation to FIG. 7b further requires that corresponding tiles in each slice (tiles in a same column of tiles) have to be of the same size, i.e. of the same width. As can be seen in FIG. 7b, the array of pixels 700 has been divided into a first slice S1 and a second slice S2. The first slice S1 has been divided into three tiles T1, T2, T3 wherein the first and second tiles T1, T2 belong to a first subset of tiles and the third tile T3 belongs to a second subset of tiles. The first and second subsets of tiles of the first slice S1 are disjunct, i.e. each tile only belongs to one of the first and second subsets of tiles. Similarly, the second slice S2 has been divided into three tiles T1, T2, T3 wherein the first tile T1 belongs to a first subset of tiles and the second and third tiles T2, T3 belong to a second subset of tiles. The first and second subsets of tiles of the second slice S2 are disjunct, i.e. each tile only belongs to one of the first and second subsets of tiles. The second border between the first and second subsets of tiles of the first slice S1 and the second border between the first and second subsets of tiles of the second slice S2 are offset in relation to each other based on the tilt angle v of the first border B. The offset is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border B between the first subset of pixels and the second subset of pixels is tilted at the tilt angle v in relation to the array of pixels. Hence, the amount of pixel data stored in the second buffer that needs be transferred to the first encoder and the amount of pixel data stored in the first buffer that needs be transferred to the second encoder is reduced in relation to not using an offset. For example, the offset may be set based on tilt angle by means of an iterative procedure such that the sum of the number of pixels to be encoded into the first subset of tiles of each slice that have pixel data stored in the second buffer and the number of pixels to be encoded into the second subset of tiles of each slice that have pixel data stored in the first buffer is determined for different offsets and the offset is set to the offset resulting in the lowest sum.

As can be seen in FIG. 7b, after dividing the array of pixels 700 into slices and tiles according to the method according to the present disclosure, pixel data of pixels corresponding to two squares have to be transferred from the second processing circuitry to the first circuitry when encoding the first subset of tiles, i.e. the first and second tiles T1, T2, of the first slice S1, and pixel data of pixels corresponding to two squares has to be transferred from the first processing circuitry to the second circuitry when encoding the second subset of tiles, i.e. the third tile T3, of the first slice S1. Furthermore, pixel data of pixels corresponding to two squares have to be transferred from the second processing circuitry to the first circuitry when encoding the first subset of tiles, i.e. the first tile T1, of the second slice S2, and pixel data of pixels corresponding to two squares have to be transferred from the first processing circuitry to the second circuitry when encoding the second subset of tiles, i.e. the second and third tiles T2, T3, of the second slice S2. Hence, in total pixel data of pixels corresponding to eight squares have to be transferred between the two processing circuitries using the method 200 of the present disclosure in this example.

The offset in FIG. 7b is six squares. If the tilt angle would have been smaller, the offset would have been smaller and vice versa.

Reference is now made to FIGS. 8a-d for a third example in which an array of pixels 800 is divided into tiles or into slices and tiles where a first border B between a first subset of pixels and a second subset of pixels is tilted at a tilt angle $v_1$ $v_2$ that varies along the first border B, such that in a first horizontal portion of the array of pixels 800 the first border B has a first tilt angle $v_1$ that is constant and in a second horizontal portion of the array of pixels 800 the first border B has a second tilt angle $v_2$ that is constant but different from the first tilt angle $v_1$. The first subset of pixels consists of the squares indicated with the figure "1" and the second subset of pixels consists of the squares indicated with the figure "2". The first subset of pixels has pixel data buffered in the first buffer in the first processing circuitry and the second subset of pixels has pixel data buffered in the first buffer in the first processing circuitry. Each square could correspond to a single pixel or a block of pixels comprising more than one pixel.

Figure 8A:
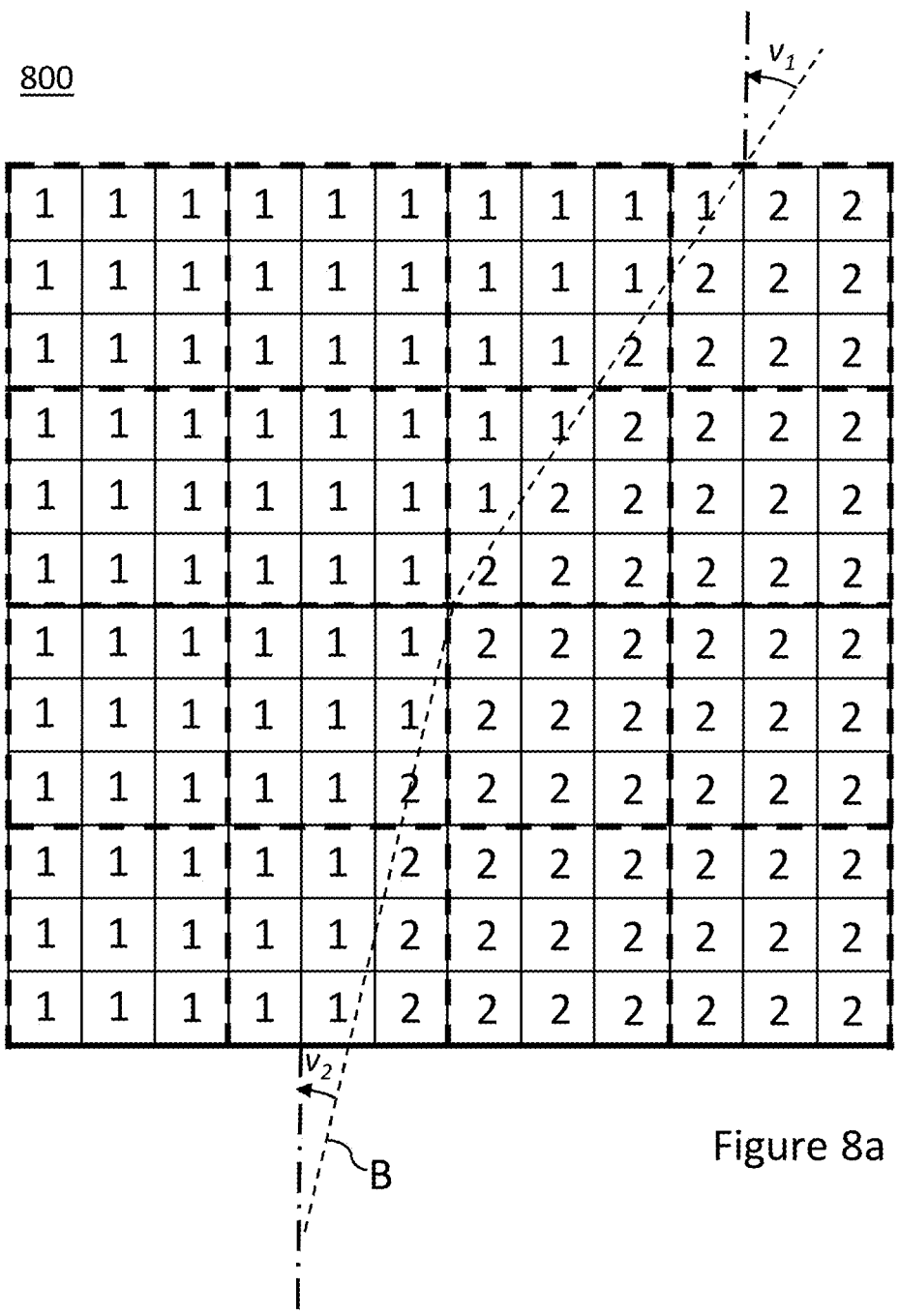
FIG. 8a shows a division of an array of pixels according to a prior art method into tiles for a third example with a varying tilt angle where the tilt angle is constant but different in two horizontal portions.

In FIG. 8a, the array of pixels 800 has been divided into sixteen tiles—four columns of tiles with four tiles in each column—according to a prior art method. The pixels of the eight tiles in the first two columns from the left are encoded by the first encoder in the first processing circuitry and eight tiles in the last two columns from the left are encoded by the second encoder in the second processing circuitry. As can be seen in FIG. 8a, after dividing the array of pixels 800 into tiles according to the prior art method, pixel data of pixels corresponding to four squares have to be transferred from the second processing circuitry to the first circuitry when encoding the eight tiles of the first two columns by the first encoder, and pixel data of pixels corresponding to twelve squares have to be transferred from the first processing circuitry to the second circuitry when encoding the eight tiles of the last two columns by the second encoder. Hence, in total pixel data of pixels corresponding to sixteen squares have to be transferred between the two processing circuitries using the prior art method in this example.

Figure 8B:
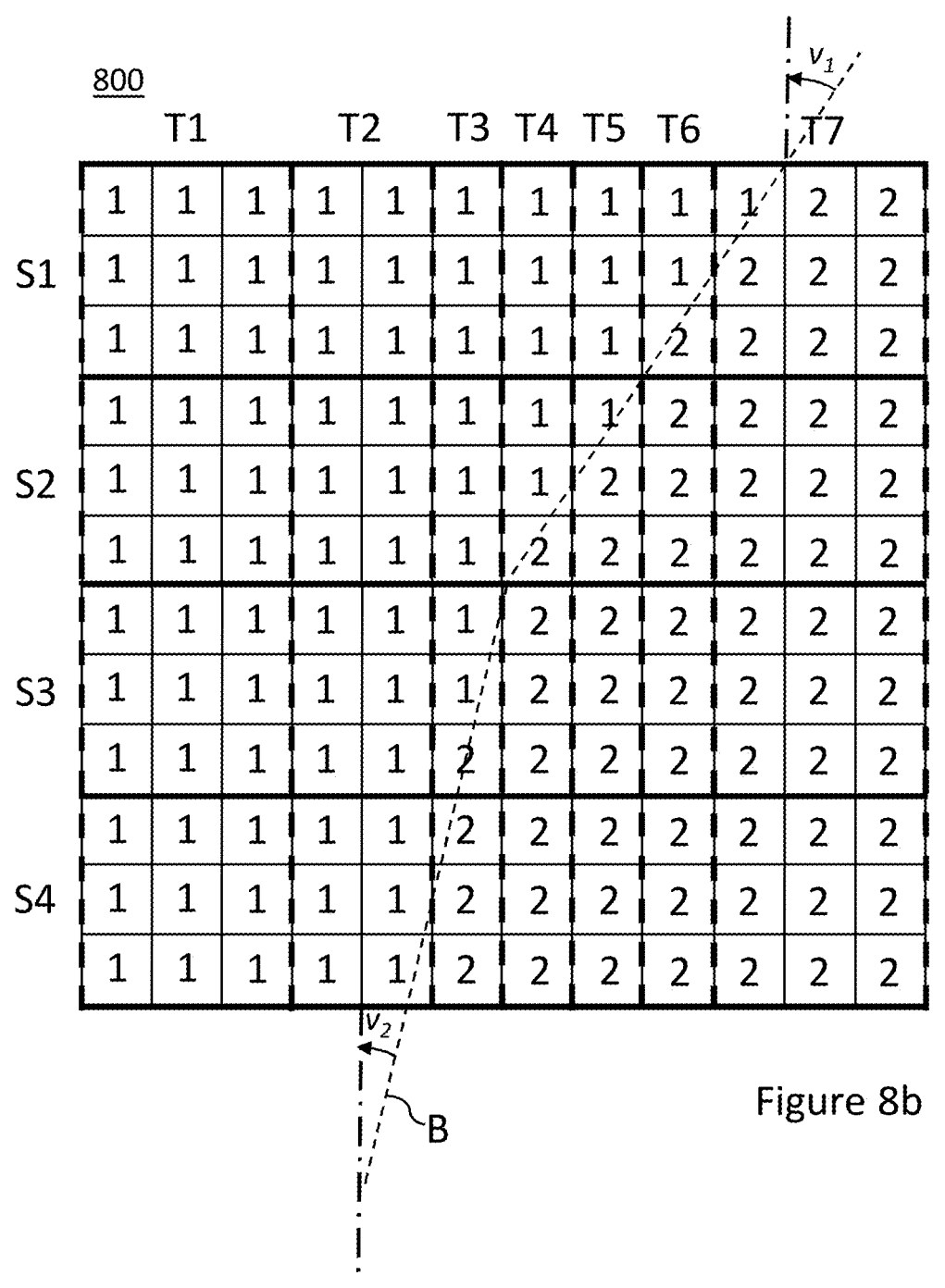

When a method 200 according to the present disclosure is performed for this third example as shown in FIG. 8b, the array of pixels 800 is first divided into two or more slices and each slice is then divided into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. When each slice is divided into two or more tiles, a second border between the first subset of tiles and the second subset of tiles is set at an offset between two adjacent slices of the two or more slices, wherein the offset is based on the tilt angle $v_1$ $v_2$. The division into slices and tiles of the method used in relation to FIG. 8b further requires that corresponding tiles in each slice (tiles in a same column of tiles) have to be of the same size, i.e. of the same width. The tilt angle $v_1$ $v_2$ is constant but different in two horizontal portions and the two horizontal portions are divided into two slices each. As can be seen in FIG. 8b, the array of pixels 800 has been divided into a first slice S1, a second slice S2, a third slice S3, and a fourth slice S4. The first slice S1 has been divided into seven tiles T1-T7, wherein the first to sixth tiles T1-T6 belong to a first subset of tiles of the first slice S1 and the seventh tile T7 belongs to a second subset of tiles of the first slice S1. Similarly, the second slice S2 has been divided into seven tiles T1-T7, wherein the first to fourth tiles T1-T4 belong to a first subset of tiles of the second slice S2 and the fifth to seventh tiles T5-T7 belong to a second subset of tiles of the second slice S2. The third slice S3 has been divided into seven tiles T1-T7, wherein the first to third tiles T1-T3 belong to a first subset of tiles of the third slice S3 and the fourth to seventh tiles T4-T7 belong to a second subset of tiles of the third slice S3. Finally, the fourth slice S4 has been divided into seven tiles T1-T7, wherein the first and second tiles T1, T2 belong to a first subset of tiles of the fourth slice S4 and the third to seventh tiles T3-T7 belong to a second subset of tiles of the fourth slice S4. The first and second subsets of tiles of each of the slices are disjunct, i.e. each tile only belongs to one of the first and second subsets of tiles. The second border between the first and second subsets of tiles of the first slice S1 and the second border between the first and second subsets of tiles of the second slice S2 are offset in relation to each other based on the local tilt angle $v_1$ of the first border B in the horizontal portion the third and fourth slices S3, S4. The second border between the first and second subsets of tiles of the second slice S2 and the second border between the first and second subsets of tiles of the third slice S2 are offset in relation to each other based on the local tilt angle $v_1$ $v_2$ of the first border B in the horizontal portion the second and third slices S2, S3. As the second and third slices S2, S3 are located in different ones of the horizontal portions having different constant tilt angles, the local tilt angle in the second and third slices S2, S3 can be determined as the average of the first and second tilt angles $v_1$ $v_2$. The second border between the first and second subsets of tiles of the third slice S3 and the second border between the first and second subsets of tiles of the fourth slice S4 are offset in relation to each other based on the local tilt angle $v_2$ of the first border B in the horizontal portion the third and fourth slices S3, S4 are located. The respective offset between each two adjacent slices is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border B between the first subset of pixels and the second subset of pixels is tilted at the varying tilt angle $v_1$ $v_2$ in relation to the array of pixels. Hence, the amount of pixel data stored in the second buffer that needs be transferred to the first encoder and the amount of pixel data stored in the first buffer that needs be transferred to the second encoder is reduced in relation to not using an offset.

As can be seen in FIG. 8b, after dividing the array of pixels 800 into slices and tiles according to the method according to the present disclosure, pixel data of pixels corresponding to one square have to be transferred from the second processing circuitry to the first circuitry when encoding the first subset of tiles, i.e. the first to sixth tiles T1-T6, of the first slice S1, and pixel data of pixels corresponding to one square have to be transferred from the first processing circuitry to the second circuitry when encoding the second subset of tiles, i.e. the seventh tile T7, of the first slice S1. Furthermore, pixel data of pixels corresponding to one square has to be transferred from the second processing circuitry to the first circuitry when encoding the first subset of tiles, i.e. the first to fourth tiles T1-T4, of the second slice S2, and pixel data of pixels corresponding to one square has to be transferred from the first processing circuitry to the second circuitry when encoding the second subset of tiles, i.e. the fifth to seventh tiles T5-T7, of the second slice S2. Furthermore, pixel data of pixels corresponding to one square have to be transferred from the second processing circuitry to the first circuitry when encoding the first subset of tiles, i.e. the first to third tiles T1-T3, of the third slice S3, and pixel data of pixels corresponding to zero squares have to be transferred from the first processing circuitry to the second circuitry when encoding the second subset of tiles, i.e. the fourth to seventh tiles T4-T7, of the third slice S3. Finally, pixel data of pixels corresponding to zero squares have to be transferred from the second processing circuitry to the first circuitry when encoding the first subset of tiles, i.e. the first and second tiles T1 and T2, of the fourth slice S4, and pixel data of pixels corresponding to zero squares have to be transferred from the first processing circuitry to the second circuitry when encoding the second subset of tiles, i.e. the third to seventh tiles T3-T7, of the fourth slice S4. Hence, in total pixel data of pixels corresponding to five squares have to be transferred between the two processing circuitries using the method 200 of the present disclosure in this example.

The offset in FIG. 8b is two squares between the first and second slice, one square between the second and third slices S2, S3, and one square between the third and fourth slices S3, S4. If the tilt angle would have been smaller in any of the adjacent slices, the offset would have been smaller between those adjacent slices and vice versa.

Reference is now made to FIG. 8c, wherein a division of the array of pixels 800 into slices and tiles according to the present disclosure is illustrated for the third example. In contrast to the division described in relation to FIG. 8b, for the division into slices and tiles of the method used in relation to FIG. 8c there is no restriction in relation to size of tiles in different slices. Hence the size and position in a slice of the tiles can be set independently. Consequently, as can be seen in FIG. 8c, the array of pixels 800 has been divided into first to fourth slices S1, S2, S3, S4. The first slice S1 has been divided into four tiles, wherein the first three tiles from the left belong to a first subset of tiles of the first slice S1 and the last tile belongs to a second subset of tiles of the first slice S1. Similarly, the second slice S2 has been divided into five tiles, wherein the first three tiles belong to a first subset of tiles of the second slice S2 and the last two tiles belong to a second subset of tiles of the second slice S2. The third slice S3 has been divided into four tiles, wherein the first two tiles from the left belong to a first subset of tiles of the third slice S3 and the last two tiles belong to a second subset of tiles of the third slice S3. Finally, the fourth slice S4 has been divided into five tiles, wherein the first two tiles from the left belong to a first subset of tiles of the fourth slice S4 and the last three tiles belong to a second subset of tiles of the fourth slice S4. The first and second subsets of tiles of each of the slices are disjunct, i.e. each tile only belongs to one of the first and second subsets of tiles. The second border between the first and second subsets of tiles of the first slice S1 and the second border between the first and second subsets of tiles of the second slice S2 are offset in relation to each other based on the local tilt angle $v_1$ of the first border B in the horizontal portion the first and second slices S1, S2. The second border between the first and second subsets of tiles of the second slice S2 and the second border between the first and second subsets of tiles of the third slice S3 are offset in relation to each other based on the local tilt angles $v_1$ and $v_2$ of the first border B in the horizontal portion the second and third slices S2, S3. As the second and third slices S2, S3 are located in different ones of the horizontal portions having different constant tilt angles, the local tilt angle in the second and third slices S2, S3 can be determined as the average of the first and second tilt angles $v_1$ $v_2$. The second border between the first and second subsets of tiles of the third slice S3 and the second border between the first and second subsets of tiles of the fourth slice S4 are offset in relation to each other based on the local tilt angle $v_2$ of the first border B in the horizontal portion the third and fourth slices S3, S4. The respective offset between each two adjacent slices is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border B between the first subset of pixels and the second subset of pixels is tilted at a tilt angle $v_1$ or $v_2$, or at a varying tilt angle $v_2$, in relation to the array of pixels. Hence, the amount of pixel data stored in the second buffer that needs be transferred to the first encoder and the amount of pixel data stored in the first buffer that needs be transferred to the second encoder is reduced in relation to not using an offset.

As can be seen in FIG. 8c, after dividing the array of pixels 800 into slices and tiles according to the method according to the present disclosure where sizes of tiles can be set independently in different slices, pixel data of pixels corresponding to one square have to be transferred from the second processing circuitry to the first circuitry when encoding the first subset of tiles, i.e. the first to third tiles, of the first slice S1, and pixel data of pixels corresponding to one square have to be transferred from the first processing circuitry to the second circuitry when encoding the second subset of tiles, i.e. the fourth tile, of the first slice S1. Furthermore, pixel data of pixels corresponding to one square have to be transferred from the second processing circuitry to the first circuitry when encoding the first subset of tiles, i.e. the first to third tiles, of the second slice S2, and pixel data of pixels corresponding to one square have to be transferred from the first processing circuitry to the second circuitry when encoding the second subset of tiles, i.e. the fourth and fifth tiles, of the second slice S2. Furthermore, pixel data of pixels corresponding to one square have to be transferred from the second processing circuitry to the first circuitry when encoding the first subset of tiles, i.e. the first and second tiles, of the third slice S3, and pixel data of pixels corresponding to zero squares have to be transferred from the first processing circuitry to the second circuitry when encoding the second subset of tiles, i.e. the third and fourth tiles, of the third slice S3. Finally, pixel data of pixels corresponding to zero squares have to be transferred from the second processing circuitry to the first circuitry when encoding the first subset of tiles, i.e. the first and second tiles, of the fourth slice S4, and pixel data of pixels corresponding to zero squares have to be transferred from the first processing circuitry to the second circuitry when encoding the second subset of tiles, i.e. the third to fifth tiles, of the fourth slice S4. Hence, in total pixel data of pixels corresponding to five squares have to be transferred between the two processing circuitries using the method 200 of the present disclosure in this example.

The offset in FIG. 8c is two squares between the first and second slice S1, S2, one square between the second and third slices S2, S3, and one square between the third and fourth slices S3, S4. If the tilt angle would have been smaller in any of the adjacent slices, the offset would have been smaller between those adjacent slices and vice versa.

It is to be noted that even if there is no restriction in relation to size of tiles in different slices in relation to FIG. 8c, each slice has been divided into more than two tiles. In alternative, each slice could have also been divided into two tiles, one on each side of the first border. However, dividing the slices into more than two tiles where the tiles are of similar sizes may simplify scheduling of encoding since encoding the similar size tiles will take a similar amount of time. Furthermore, this enable use of image data in the respective buffer for corresponding tiles in other slices of the two or more slices.

Figure 8D:
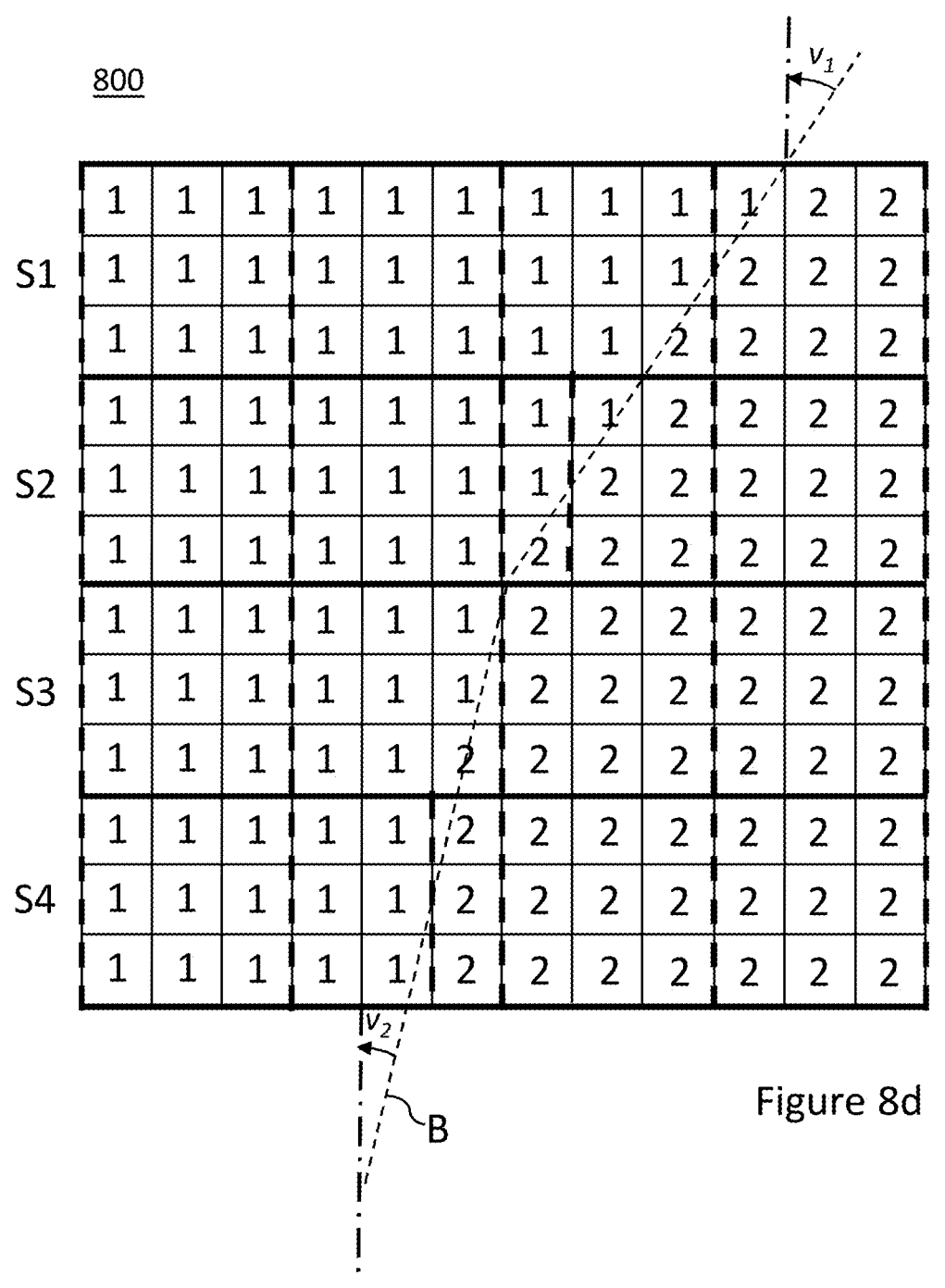

As a further alternative, FIG. 8d shows a division into slices and tiles of the array of pixels 800 for a case where it is required that corresponding tiles in each slice (tiles in a same column of tiles) except for tiles at the first border B between the first subset of pixels and the second subset of pixels have to be of the same size, i.e. of the same width. As can be seen, most corresponding tiles in the slices are of the same size. However, the width of tiles at the first border B between the first subset of pixels and the second subset of pixels in the second slice S2 and in the fourth slice S4 have been adapted and arranged such that the second border between the first subset of tiles and the second subset of tiles is arranged at an offset in relation to their respective adjacent slices in order to reduce the total amount of pixel data of pixels that has to be transferred between the two processing circuitries as comparted to prior art. Specifically, the offset of the second border between the first and second slices S1, S2 is two squares and, the offset of the second border between the second and third slices S2, S3 is one square, and the offset of the second border between the third and fourth slices S3, S4 is one square.

Reference is now made to FIGS. 9a-d for a fourth example in which an array of pixels 900 is divided into tiles or into slices and tiles where a first border B between a first subset of pixels and a second subset of pixels is tilted at a tilt angle that varies along the first border B, such that the first border B is curved. The first subset of pixels consists of the squares indicated with the figure "1" and the second subset of pixels consists of the squares indicated with the figure "2". The first subset of pixels has pixel data buffered in the first buffer in the first processing circuitry and the second subset of pixels has pixel data buffered in the first buffer in the first processing circuitry. Each square could correspond to a single pixel or a block of pixels comprising more than one pixel.

Figure 9A:
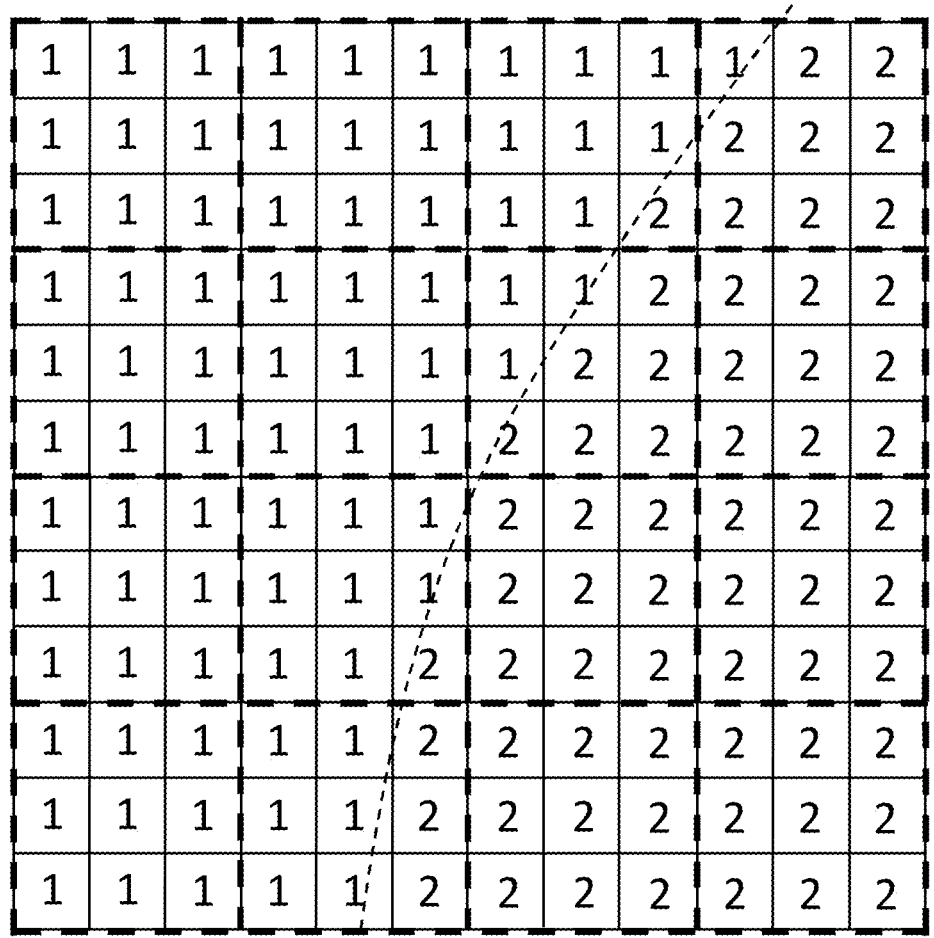
FIG. 9a shows a division of an array of pixels according to a prior art method into tiles for a fourth example with a varying tilt angle where the first border between first and second subsets of pixels is curved.
Figure 9C:
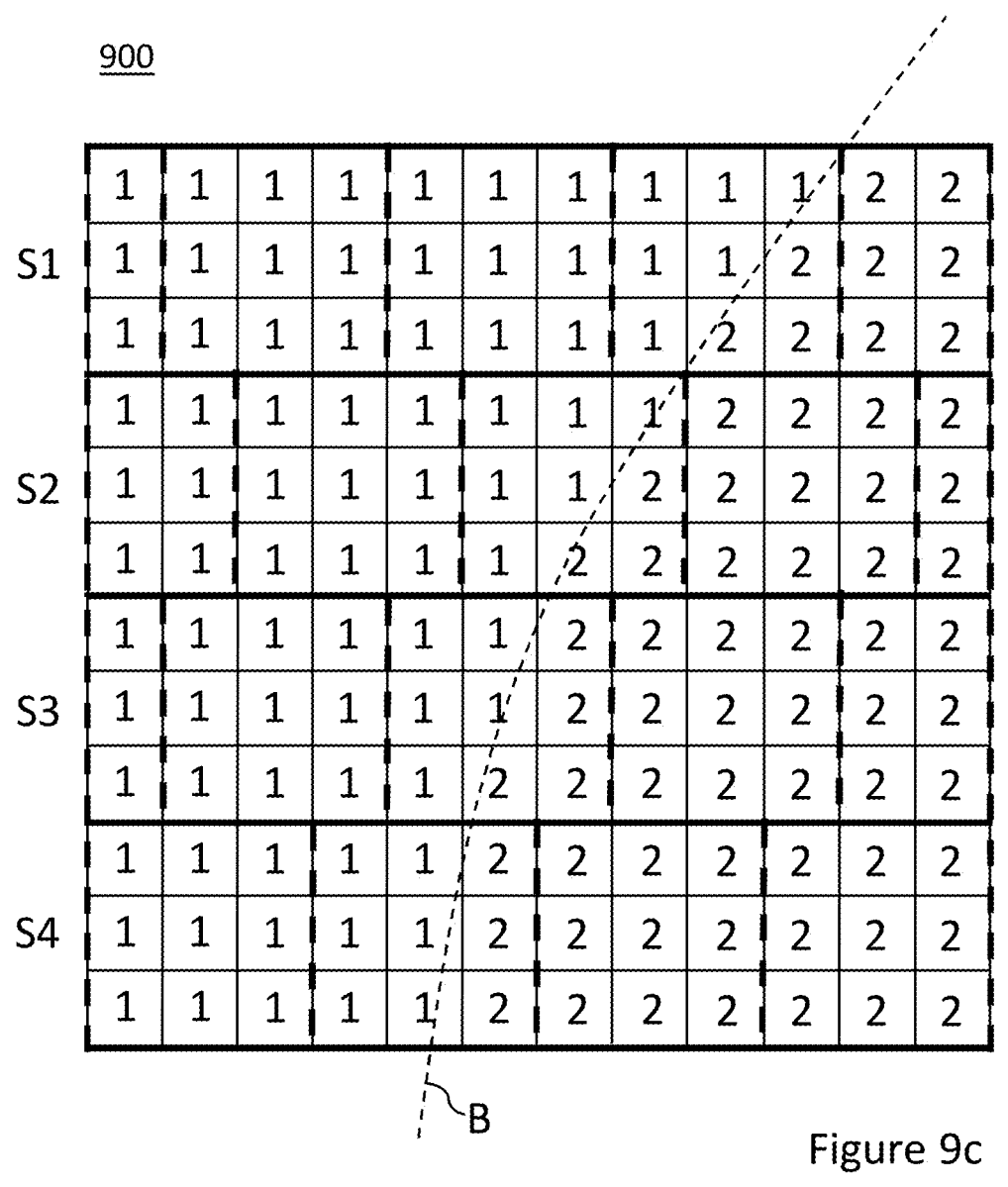

As compared to FIGS. 8a-d, the first border B between the first subset of pixels and the second subset of pixels of the array of pixels 900 in FIGS. 9a-d is also tilted at a varying tilt angle but not at a constant tilt angle in two horizontal portions of the array of pixels 900 it is instead it curved. However, as the fourth example has been designed such that the average tilt angle of the curved first border B in the first two slices S1, S2 of FIGS. 9b-d is close to the constant tilt angle in the first two slices S1, S2 of FIG. 8b-d and the curved first border B in the last two slices S3, S4 of FIGS. 9b-d is close to the constant tilt angle in the last two slices S3, S4 of FIG. 8b-d, the division into tiles based on the prior art method and into slices and tiles based on methods according the present disclosure is the same for each of FIGS. 9a-d as for FIGS. 8a-d, respectively. The location in the respective one of the first subset of tiles and second subset of tiles of each tile in each slice is also the same for FIGS. 9b, 9c and 9d as for FIGS. 8b, 8c and 8d, respectively. Similarly, the total amount of pixel data of pixels that has to be transferred between the two processing circuitries using the prior art method in relation to FIG. 9a is the same as in relation to FIG. 8a and using the methods 200 according to the present disclosure in relation to FIGS. 9b, 9c and 9d is the same as in relation to FIGS. 8b, 8c and 8d, respectively.

Reference is now made to FIGS. 10a-d for a fifth example in which an array of pixels 1000 is divided into tiles or into slices and tiles where a first border B between a first subset of pixels and a second subset of pixels is tilted at a tilt angle that varies along the first border B, such that the first border B is curved. The first subset of pixels consists of the squares indicated with the figure "1" and the second subset of pixels consists of the squares indicated with the figure "2". The first subset of pixels has pixel data buffered in the first buffer in the first processing circuitry and the second subset of pixels has pixel data buffered in the first buffer in the first processing circuitry. Each square could correspond to a single pixel or a block of pixels comprising more than one pixel.

In FIG. 10a, the array of pixels 1000 has been divided into sixteen tiles—four columns of tiles with four tiles in each column—according to a prior art method. The pixels of the eight tiles in the first two columns from the left are encoded by the first encoder in the first processing circuitry and eight tiles in the last two columns from the left are encoded by the second encoder in the second processing circuitry. As can be seen in FIG. 10a, after dividing the array of pixels 1000 into tiles according to the prior art method, pixel data of pixels corresponding to six squares have to be transferred from the second processing circuitry to the first circuitry when encoding the eight tiles of the first two columns by the first encoder, and pixel data of pixels corresponding to zero squares have to be transferred from the first processing circuitry to the second circuitry when encoding the eight tiles of the last two columns by the second encoder. Hence, in total pixel data of pixels corresponding to six squares have to be transferred between the two processing circuitries using the prior art method in this example.

When a method 200 according to the present disclosure is performed for this third example as shown in FIG. 10b, the array of pixels 1000 is first divided into two or more slices and each slice is then divided into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder. When each slice is divided into two or more tiles, a second border between the first subset of tiles and the second subset of tiles is set at an offset between two adjacent slices of the two or more slices, wherein the offset is based on the tilt angle. The division into slices and tiles of the method used in relation to FIG. 10b further requires that corresponding tiles in each slice (tiles in a same column of tiles) have to be of the same size, i.e. of the same width. The tilt angle varies along the first border B such that the first border B is curved. As can be seen in FIG. 10b, the array of pixels 1000 has been divided into a first to fourth slices S1, S2, S3, S4. The first slice S1 has been divided into five tiles T1-T5, wherein the first to third tiles T1-T3 belong to a first subset of tiles of the first slice S1 and the fourth and fifth tile T4-T5 belong to a second subset of tiles of the first slice S1. Similarly, the second slice S2 has been divided into five tiles T1-T5, wherein the first and second tiles T1, T2 belong to a first subset of tiles of the second slice S2 and the third to fifth tiles T3-T5 belong to a second subset of tiles of the second slice S2. The third slice S3 has been divided into five tiles T1-T5, wherein the first and second tiles T1, T2 belong to a first subset of tiles of the third slice S3 and the third to fifth tiles T3-T5 belong to a second subset of tiles of the third slice S3. Finally, the fourth slice S4 has been divided into five tiles T1-T5, wherein the first to third tiles T1-T3 belong to a first subset of tiles of the fourth slice S4 and the fourth and fifth tiles T4, T5 belong to a second subset of tiles of the fourth slice S4. The first and second subsets of tiles of each of the slices are disjunct, i.e. each tile only belongs to one of the first and second subsets of tiles. The second border between the first and second subsets of tiles of the first slice S1 and the second border between the first and second subsets of tiles of the second slice S2 are offset in relation to each other based on the local tilt angle of the first border B in the horizontal portion the first and second slices S1, S2. The second border between the first and second subsets of tiles of the second slice S2 and the second border between the first and second subsets of tiles of the third slice S3 are offset in relation to each other based on the local tilt angle of the first border B in the second and third slices S2, S3. The second border between the first and second subsets of tiles of the third slice S3 and the second border between the first and second subsets of tiles of the fourth slice S4 are offset in relation to each other based on the local tilt angle of the first border B in the third and fourth slices S3, S4. The local tilt angle in each two adjacent slices can be determined as the average of the tilt angle of the portion of the curved first border B in that pair of adjacent slices. The respective offset between each two adjacent slices is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border B between the first subset of pixels and the second subset of pixels is tilted at the varying tilt angle in relation to the array of pixels. Hence, the amount of pixel data stored in the second buffer that needs be transferred to the first encoder and the amount of pixel data stored in the first buffer that needs be transferred to the second encoder is reduced in relation to not using an offset.

As can be seen in FIG. 10b, after dividing the array of pixels 1000 into slices and tiles according to the method according to the present disclosure, pixel data of pixels corresponding to zero squares have to be transferred from the second processing circuitry to the first circuitry when encoding the first subset of tiles, i.e. the first to third tiles T1-T3, of the first slice S1, and pixel data of pixels corresponding to zero squares have to be transferred from the first processing circuitry to the second circuitry when encoding the second subset of tiles, i.e. the fourth and fifth tiles T4, T5, of the first slice S1. Furthermore, pixel data of pixels corresponding to zero squares have to be transferred from the second processing circuitry to the first circuitry when encoding the first subset of tiles, i.e. the first and second tiles T1, T2, of the second slice S2, and pixel data of pixels corresponding to zero squares have to be transferred from the first processing circuitry to the second circuitry when encoding the second subset of tiles, i.e. the third to fifth tiles T3-T5, of the second slice S2. Furthermore, pixel data of pixels corresponding to zero squares have to be transferred from the second processing circuitry to the first circuitry when encoding the first subset of tiles, i.e. the first to second tiles T1-T2, of the third slice S3, and pixel data of pixels corresponding to zero squares have to be transferred from the first processing circuitry to the second circuitry when encoding the second subset of tiles, i.e. the third to fifth tiles T3-T5, of the third slice S3. Finally, pixel data of pixels corresponding to zero squares have to be transferred from the second processing circuitry to the first circuitry when encoding the first subset of tiles, i.e. the first to third tiles T1-T3, of the fourth slice S4, and pixel data of pixels corresponding to zero squares have to be transferred from the first processing circuitry to the second circuitry when encoding the second subset of tiles, i.e. the fourth and fifth tiles T4, T5, of the fourth slice S4. Hence, in total no pixel data of pixels have to be transferred between the two processing circuitries using the method 200 of the present disclosure in this example.

The offset in FIG. 10b is one square between the first and second slices S1, S2, zero squares between the second and third slices S2, S3, and one square between the third and fourth slices S3, S4. If the tilt angle would have been smaller in any of the adjacent slices, the offset would have been smaller between those adjacent slices and vice versa.

Figure 10C:
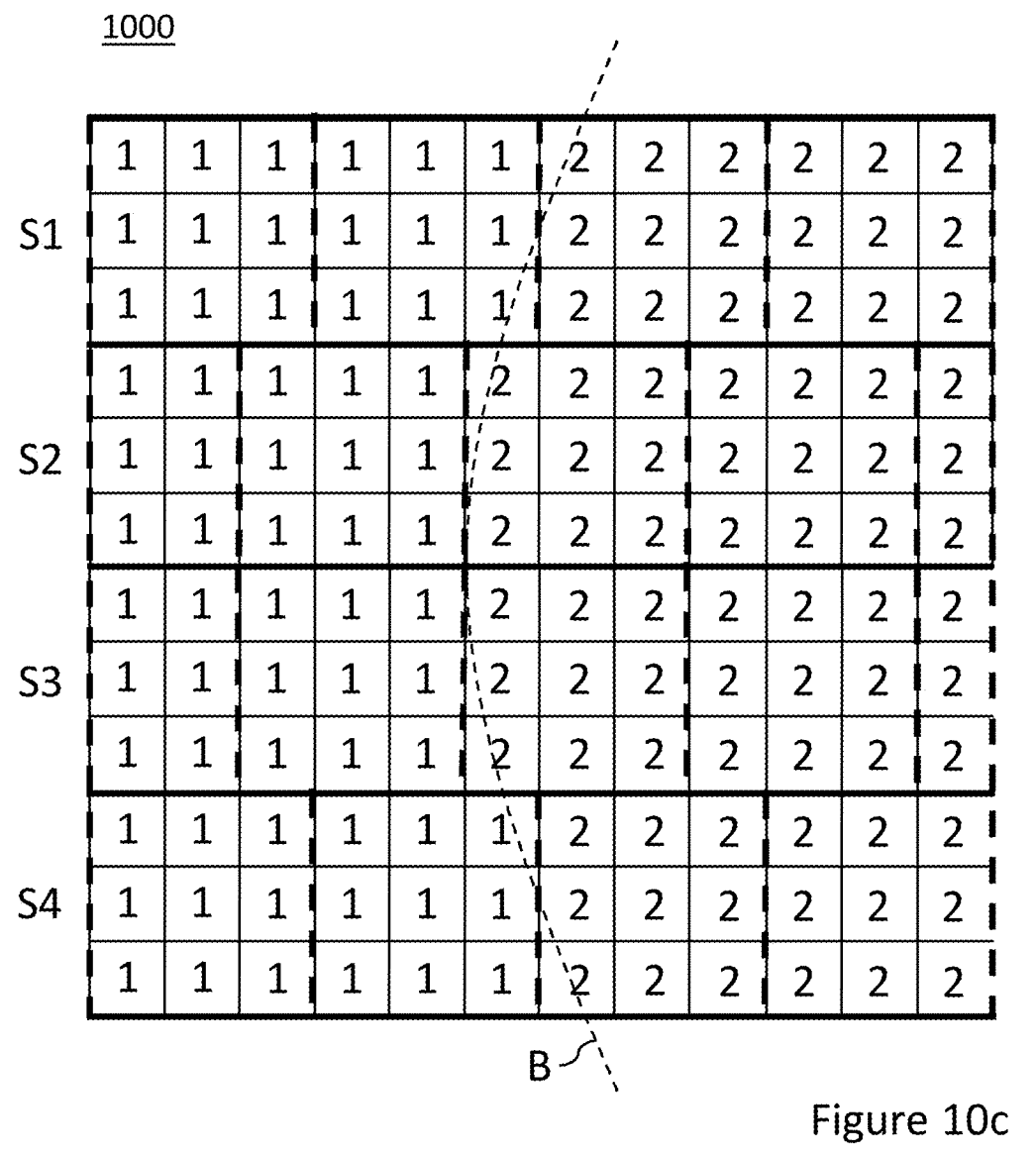

Reference is now made to FIG. 10c, wherein a division of the array of pixels 1000 into slices and tiles according to the present disclosure is illustrated for the third example. In contrast to the division described in relation to FIG. 10b, for the division into slices and tiles of the method used in relation to FIG. 10c there is no restriction in relation to size of tiles in different slices. at corresponding tiles in each slice. Hence the size and position in slice of the tiles can be set independently. Consequently, as can be seen in FIG. 10c, the array of pixels 1000 has been divided into first to fourth slices S1, S2, S3, S4. The first slice S1 has been divided into four tiles, wherein the first two tiles from the left belong to a first subset of tiles of the first slice S1 and the last two tiles belong to a second subset of tiles of the first slice S1. The second slice S2 has been divided into five tiles, wherein the first two tiles belong to a first subset of tiles of the second slice S2 and the last three tiles belong to a second subset of tiles of the second slice S2. The third slice S3 has been divided into five tiles, wherein the first two tiles from the left belong to a first subset of tiles of the third slice S3 and the last three tiles belong to a second subset of tiles of the third slice S3. Finally, the fourth slice S4 has been divided into four tiles, wherein the first two tiles from the left belong to a first subset of tiles of the fourth slice S4 and the last two tiles belong to a second subset of tiles of the fourth slice S4. The first and second subsets of tiles of each of the slices are disjunct, i.e. each tile only belongs to one of the first and second subsets of tiles. The second border between the first and second subsets of tiles of the first slice S1 and the second border between the first and second subsets of tiles of the second slice S2 are offset in relation to each other based on the local tilt angle of the first border B in the horizontal portion the first and second slices S1, S2. The second border between the first and second subsets of tiles of the second slice S2 and the border between the first and second subsets of tiles of the third slice S3 are offset in relation to each other based on the local tilt angle of the first border B in the second and third slices S2, S3. The second border between the first and second subsets of tiles of the third slice S3 and the border second between the first and second subsets of tiles of the fourth slice S4 are offset in relation to each other based on the local tilt angle of the first border B in the third and fourth slices S3, S4. The local tilt angle in each two adjacent slices can be determined as the average of the tilt angle of the portion of the curved first border B in that pair of adjacent slices. The respective offset between each two adjacent slices is selected such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset when the first border B between the first subset of pixels and the second subset of pixels is tilted at the varying tilt angle in relation to the array of pixels. Hence, the amount of pixel data stored in the second buffer that needs be transferred to the first encoder and the amount of pixel data stored in the first buffer that needs be transferred to the second encoder is reduced in relation to not using an offset.

As can be seen in FIG. 10c, after dividing the array of pixels 1000 into slices and tiles according to the method according to the present disclosure where sizes of tiles can be set independently in different slices, pixel data of pixels corresponding to zero squares have to be transferred from the second processing circuitry to the first circuitry when encoding the first subset of tiles, i.e. the first and second tiles, of the first slice S1, and pixel data of pixels corresponding to zero squares have to be transferred from the first processing circuitry to the second circuitry when encoding the second subset of tiles, i.e. the third and fourth tiles, of the first slice S1. Furthermore, pixel data of pixels corresponding to zero squares have to be transferred from the second processing circuitry to the first circuitry when encoding the first subset of tiles, i.e. the first and second tile, of the second slice S2, and pixel data of pixels corresponding to zero squares have to be transferred from the first processing circuitry to the second circuitry when encoding the second subset of tiles, i.e. the third to fifth tiles, of the second slice S2. Furthermore, pixel data of pixels corresponding to zero squares have to be transferred from the second processing circuitry to the first circuitry when encoding the first subset of tiles, i.e. the first and second tiles, of the third slice S3, and pixel data of pixels corresponding to zero squares have to be transferred from the first processing circuitry to the second circuitry when encoding the second subset of tiles, i.e. the third to fifth tiles, of the third slice S3. Finally, pixel data of pixels corresponding to zero squares have to be transferred from the second processing circuitry to the first circuitry when encoding the first subset of tiles, i.e. the first and second tiles, of the fourth slice S4, and pixel data of pixels corresponding to zero squares have to be transferred from the first processing circuitry to the second circuitry when encoding the second subset of tiles, i.e. the third and fourth tiles, of the fourth slice S4. Hence, in total no pixel data have to be transferred between the two processing circuitries using the method 200 of the present disclosure in this example.

The offset in FIG. 10c is one square between the first and second slice S1, S2, zero squares between the second and third slices S2, S3, and one square between the third and fourth slices S3, S4. If the tilt angle would have been smaller in any of the adjacent slices, the offset would have been smaller between those adjacent slices and vice versa.

Figure 10D:
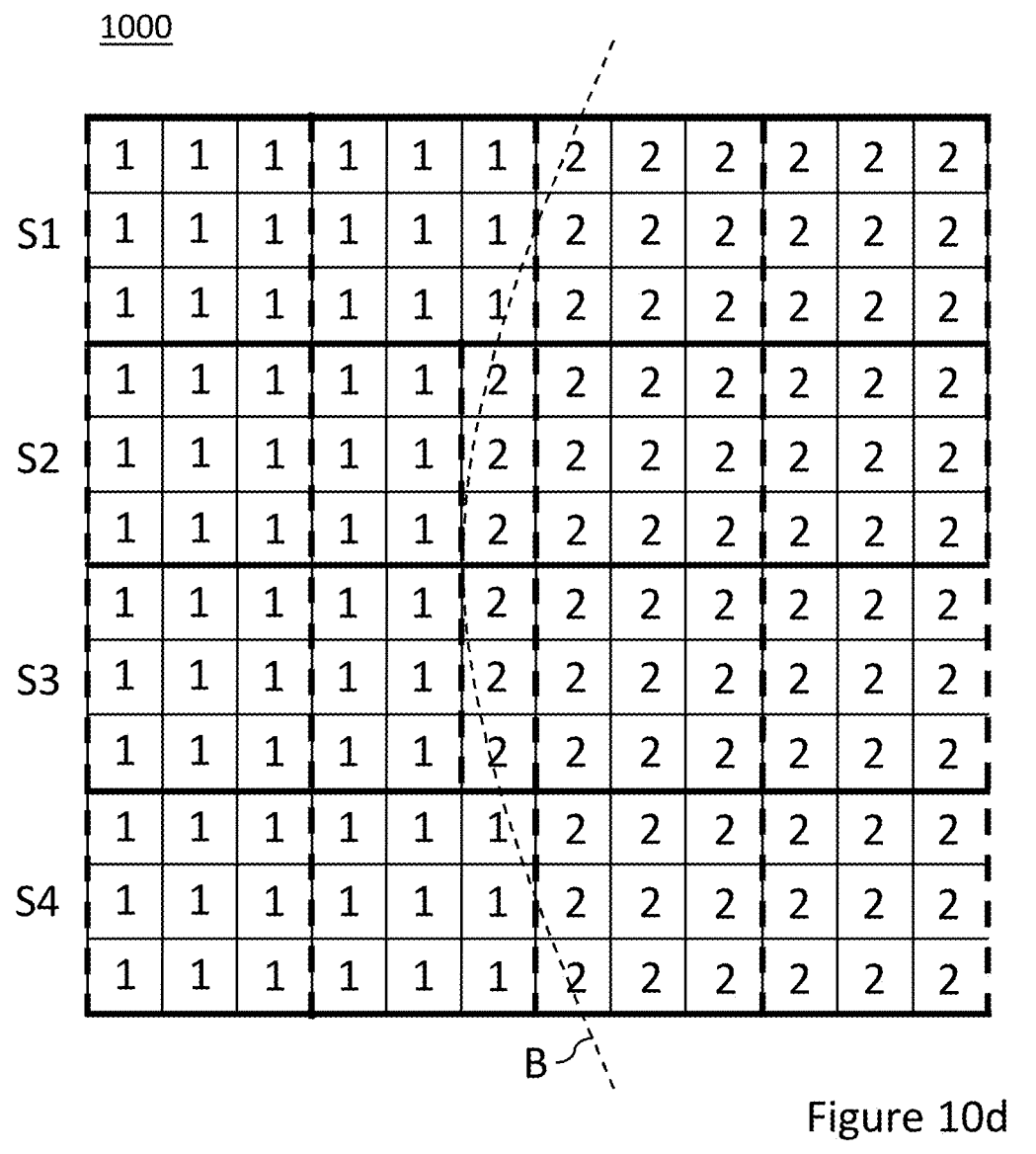

As a further alternative, FIG. 10d shows a division into slices and tiles of the array of pixels 1000 for a case where it is required that corresponding tiles in each slice (tiles in a same column of tiles) except for tiles at the first border B between the first subset of pixels and the second subset of pixels have to be of the same size, i.e. of the same width. As can be seen most corresponding tiles in the slices are of the same size. However, the width of tiles at the first border B between the first subset of pixels and the second subset of pixels in the second slice S2 and in the third slice S3 have been adapted and arranged such that the second border between the first subset of tiles and the second subset of tiles is arranged at an offset in relation to their respective adjacent slices in order to reduce the total amount of pixel data of pixels that has to be transferred between the two processing circuitries as comparted to prior art. Specifically, the offset of the second border between the first and second slices S1, S2 is one squares and, the offset of the second border between the second and third slices S2, S3 is zero squares, and the offset of the second border between the third and fourth slices S3, S4 is one square.

The person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

For example, the examples have all been described in relation to slices with equal size, i.e. equal heights in number of pixels/pixel blocks. However, different size slices may be used. For example, for a varying tilt angle along the first border, division into different size slices may be beneficial in differing horizontal portions of the array of pixels.

The invention claimed is:

1. A method for dividing an array of pixels into slices and tiles for encoding the array of pixels into an encoded video stream by means of a first encoder arranged in a first image processing circuitry and a second encoder arranged in a second image processing circuitry, wherein pixels of the array of pixels are arranged at regular intervals along a vertical direction and a horizontal direction, wherein each slice is separated by a straight horizontal line over the full width from the respective adjacent slices and is encoded without the need for access to image data relating to other slices and each tile is separated by a vertical straight line over the full height of a slice from respective adjacent tiles in the same slice and is encoded without the need for access to image data relating to other tiles, wherein the array of pixels consists of a first subset of pixels having pixel data stored in a first buffer arranged in the first image processing circuitry and a second subset of pixels having pixel data stored in a second buffer arranged in the second image processing circuitry, wherein a first border between the first subset of pixels and the second subset of pixels is tilted at a tilt angle in relation to the array of pixels, the method comprising:
  dividing the array of pixels into two or more slices; and
  dividing each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder,
  wherein the act of dividing each slice into two or more tiles comprises setting a second border between the first subset of tiles and the second subset of tiles at an offset along the horizontal direction between two adjacent slices of the two or more slices such that the second border between the first subset of tiles and the second subset of tiles in two adjacent slices are not aligned along the horizontal direction, wherein the offset is based on the tilt angle such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset, and
  wherein the method further comprises:
  transferring, from the second buffer to the first encoder, pixel data of pixels to be encoded into the first subset of tiles of each slice having pixel data stored in the second buffer;
  encoding the first subset of tiles by means of the first encoder;
  transferring, from the first buffer to the second encoder, pixel data of pixels to be encoded into the second subset of tiles of each slice having pixel data stored in the first buffer; and
  encoding the second subset of tiles by means of the second encoder.

2. The method of claim 1, wherein the tilt angle is constant along the first border between the first subset of pixels and the second subset of pixels.

3. The method of claim 1,
  wherein the tilt angle varies along the first border between the first subset of pixels and the second subset of pixels,
  wherein the act of dividing the array of pixels into two or more slices comprises dividing the array of pixels into three or more slices,
  wherein the act of dividing each slice into two or more tiles comprises, for each two adjacent slices of the three or more slices, setting the second border between the first subset of tiles and the second subset of tiles of each slice of the two adjacent slices at an offset, wherein the offset is based on a local tilt angle of the first border between the first subset of pixels and the second subset of pixels in the two adjacent slices.

4. The method of claim 3, wherein the first border between the first subset of pixels and the second subset of pixels is curved.

5. The method of claim 3, wherein the first border between the first subset of pixels and the second subset of pixels is tilted at a constant but separate tilt angle in separate horizontal portions of the array of pixels.

6. The method of claim 5, wherein the act of dividing the array of pixels into three or more slices comprises dividing the array of pixels into four or more slices by dividing each separate horizontal portion of the array of pixels into two or more slices such that, for each two adjacent horizontal portions, a third border between the two adjacent horizontal portions is aligned with a fourth border between two slices.

7. The method of claim 3, wherein the local tilt angle of the first border between the first subset of pixels and the second subset of pixels in the two adjacent slices is determined as an average tilt angle in the two adjacent slices.

8. The method according to claim 1, wherein sizes of corresponding tiles of the two or more tiles of each of the two or more slices are the same in each of the two or more slices.

9. A non-transitory computer-readable storage medium having stored thereon instructions for implementing the method according to claim 1 when executed by a device having processing capabilities.

10. An image processing device for dividing an array of pixels into slices and tiles for encoding the array of pixels into an encoded video stream by means of a first encoder arranged in a first image processing circuitry and a second encoder arranged in a second image processing circuitry, wherein pixels of the array of pixels are arranged at regular intervals along a vertical direction and a horizontal direction, wherein each slice is separated by a straight horizontal line over the full width from the respective adjacent slices and is encoded without the need for access to image data relating to other slices and each tile is separated by a vertical straight line over the full height of a slice from respective adjacent tiles in the same slice and is encoded without the need for access to image data relating to other tiles, wherein the array of pixels consists of a first subset of pixels having pixel data stored in a first buffer arranged in the first image processing circuitry and a second subset of pixels having pixel data stored in a second buffer arranged in the second image processing circuitry, wherein a first border between the first subset of pixels and the second subset of pixels is tilted at a tilt angle in relation to the array of pixels, the image processing device comprising circuitry configured to execute:
 a first dividing function configured to divide the array of pixels into two or more slices; and
 a second dividing function configured to divide each slice into two or more tiles, wherein the two or more tiles of each slice consists of a first subset of tiles and a second subset of tiles, wherein the first subset of tiles and the second subset of tiles are disjunct and the first subset of tiles is to be encoded by the first encoder and the second subset of tiles is to be encoded by the second encoder,
 wherein the second dividing function is further configured to set a second border between the first subset of tiles and the second subset of tiles at an offset along the horizontal direction between two adjacent slices of the two or more slices such that the second border between the first subset of tiles and the second subset of tiles in two adjacent slices are not aligned along the horizontal direction, wherein the offset is based on the tilt angle such that the number of pixels to be encoded into the first subset of tiles of each slice that have pixel data stored in the second buffer plus the number of pixels to be encoded into the second subset of tiles of each slice that have pixel data stored in the first buffer is reduced in relation to not using an offset,
 wherein the circuitry is further configured to execute:
 a first transferring function configured to transfer, from the second buffer to the first encoder, pixel data of pixels to be encoded into the first subset of tiles of each slice having pixel data stored in the second buffer;
 a first instructing function configured to instruct the first encoder to encode the first subset of tiles, wherein the first encoder is configured to encode the first subset of tiles;
 a second transferring function configured to transfer, from the first buffer to the second encoder, pixel data of pixels to be encoded into the second subset of tiles of each slice having pixel data stored in the first buffer; and
 a second instructing function configured to instruct the second encoder to encode the second subset of tiles, wherein the second encoder is configured to encode the second subset of tiles.

11. The image processing device of claim 10, wherein the tilt angle varies along the first border between the first subset of pixels and the second subset of pixels,
 wherein the first dividing function is configured to divide the array of pixels into three or more slices, and
 wherein second dividing function is configured to, for each two adjacent slices of the three or more slices, set the second border between the first subset of tiles and the second subset of tiles of each slice of the two adjacent slices at an offset, wherein the offset is based on a local tilt angle of the first border between the first subset of pixels and the second subset of pixels in the two adjacent slices.

12. The image processing device of claim 11,
 wherein the first border between the first subset of pixels and the second subset of pixels is tilted at a constant but separate tilt angle in separate horizontal portions of the array of pixels,
 wherein the second dividing function is configured to divide each separate horizontal portion of the array of pixels into two or more slices such that, for each two adjacent horizontal portions, a third border between the two adjacent horizontal portions is aligned with a fourth border between two adjacent slices.

13. The image processing device of claim 11, wherein the second dividing function is further configured to determine the local tilt angle of the first border between the first subset of pixels and the second subset of pixels in the two adjacent slices is as an average tilt angle in the two adjacent slices.

* * * * *